US012418896B2

(12) United States Patent
Ren

(10) Patent No.: US 12,418,896 B2
(45) Date of Patent: Sep. 16, 2025

(54) RESOURCE BLOCK UTILIZATION CALCULATION FOR SPECTRUM SHARING

(71) Applicant: Telefonaktiebolaget LM Ericsson (publ), Stockholm (SE)

(72) Inventor: Hong Ren, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

(21) Appl. No.: 18/028,899

(22) PCT Filed: Oct. 8, 2021

(86) PCT No.: PCT/IB2021/059247
§ 371 (c)(1),
(2) Date: Mar. 28, 2023

(87) PCT Pub. No.: WO2022/079559
PCT Pub. Date: Apr. 21, 2022

(65) Prior Publication Data
US 2023/0345428 A1    Oct. 26, 2023

Related U.S. Application Data

(60) Provisional application No. 63/091,660, filed on Oct. 14, 2020.

(51) Int. Cl.
H04W 72/044   (2023.01)
H04W 16/14    (2009.01)
(52) U.S. Cl.
CPC ......... H04W 72/044 (2013.01); H04W 16/14 (2013.01)

(58) Field of Classification Search
CPC .......................... H04W 72/044; H04W 16/14
See application file for complete search history.

(56) References Cited

U.S. PATENT DOCUMENTS 10,624,114 B2      4/2020  Abdel Shahid et al.
2018/0049173 A1*   2/2018  Chen ................... H04W 76/28
2018/0124790 A1*   5/2018  Yerramalli ........ H04W 72/0453
(Continued)

OTHER PUBLICATIONS

International Search Report and Written Opinion of the International Searching Authority for PCT International Application No. PCT/IB2021/059247 dated Jan. 18, 2022.
(Continued)

Primary Examiner — Jael M Ulysse
(74) Attorney, Agent, or Firm — Sonoda & Kobayashi Intellectual Property Law; Sarvajit S. Patil

(57) ABSTRACT

A method performed by a network device processor to determine a number of available resource blocks, RBs, in a time slot of a spectrum of a given bandwidth includes determining whether or not the slot is assigned to LTE and NR. The method includes responsive to the slot being assigned to LTE and NR and starts from a low frequency with NR and ends at a high frequency with LTE, and the RB segment at a lowest spectrum part assigned to NR and the RB segment at a highest spectrum part assigned to LTE: responsive to a number m of LTE segments crossing or above a DC subcarrier, determining that the number of available RBs in the slot is A+p−(m−1), or B−p−(m−1), where A and B are LTE and NR cell channel bandwidth, respectively, and p is the number based on a cell channel bandwidth.

24 Claims, 13 Drawing Sheets

(56) References Cited

U.S. PATENT DOCUMENTS

| | | | |
|---|---|---|---|
| 2018/0167946 A1* | 6/2018 | Si | H04L 5/0048 |
| 2019/0045489 A1* | 2/2019 | He | H04L 1/1812 |
| 2020/0163125 A1* | 5/2020 | Chakraborty | H04W 48/12 |
| 2021/0091897 A1* | 3/2021 | Gheorghiu | H04W 24/10 |
| 2022/0095385 A1* | 3/2022 | Yi | H04W 74/0833 |
| 2023/0239891 A1* | 7/2023 | Noh | H04L 5/0094 |
| | | | 370/329 |

OTHER PUBLICATIONS

Ericsson, "Coexistence of LTE-MTC with NR", R1-1903885, 3GPP TSG RAN WG1 Meeting #96bis, Xi'an, China; Apr. 3-12, 2019, 17 pages.
Ericsson, "NR and NB-IoT Coexistence", R1-1810197, 3GPP TSG RAN WG1 Meeting #94bis, Chengdu, China; Oct. 8-12, 2018, 14 pages.
Ericsson, "Coexistence of LTE-MTC with NR", R1-1812122, 3GPP TSG RAN WG1 Meeting #95, Spokane, USA; Nov. 12-17, 2018, 16 pages.

* cited by examiner

↑ DC SUBCARRIER

↑ DC SUBCARRIER

↑ DC SUBCARRIER

↑ DC SUBCARRIER

FREQUENCY FROM LOW TO HIGH →

NR ▨   LTE ☐

↑ DC SUBCARRIER

↑ DC SUBCARRIER

↑ DC SUBCARRIER

RESOURCE BLOCK UTILIZATION CALCULATION FOR SPECTRUM SHARING

CROSS REFERENCE TO RELATED APPLICATIONS

This application is a 35 U.S.C. § 371 national stage application of PCT International Application No. PCT/IB2021/059247 filed Oct. 8, 2021, which claims the benefit of U.S. Provisional Patent Application Ser. No. 63/091,660, filed on Oct. 14, 2020, the disclosures and content of which are incorporated by reference herein in their entireties.

TECHNICAL FIELD

The present disclosure relates generally to communications, and more particularly to communication methods and related devices and nodes supporting wireless communications.

BACKGROUND

Wireless operators in the world are deploying or planning to deploy 5th Generation (5G) NR (New Radio) products in their network as early as possible. However, given the low NR user penetration now, the wireless operators do not want to allocate a dedicated spectrum to NR.

One way to deploy the 5G NR products without having to allocate a dedicated spectrum to NR is through spectrum sharing between 4G LTE (long term evolution) and 5G NR.

With spectrum sharing, the same spectrum can be used to serve LTE and NR users at the same time. For example instant spectrum sharing (ISS) features have been introduced, which allows the spectrum to be shared by LTE and NR users at slot level. Basically, for a given slot, some resource blocks (RBs) can be used by LTE users while other radio blocks can be used for NR users. The numbers of radio blocks assigned to LTE and NR are determined based on estimated LTE and NR demands.

According to 3rd Generation Partnership Project (3GPP) specifications, the number of resources blocks available to LTE and NR are different for a given bandwidth. For example, for a spectrum of 10 MHz, there are 50 RBs for LTE while there are 52 RBs for NR. Figure a shows the RB grid for a 10 MHz bandwidth.

The following can be observed from FIG. 1:

Below the DC (direct current) subcarrier, LTE and NR RBs are aligned, but NR has one more RBs Above the DC subcarrier, LTE and NR RBs are not aligned. LTE RBs are shifted towards the high frequency by one subcarrier since LTE doesn't use the DC subcarrier. Again, NR has one more RB than LTE.

The RB grid for 15 MHz is illustrated in FIG. 2 and is slightly different. In FIG. 2, the DC subcarrier is in the middle of an LTE RB Similarly, the RBs below DC subcarriers are aligned, but RBs above DC subcarrier are not aligned. For 15 MHz, there are 75 RBs for LTE and 79 RBs for NR.

SUMMARY

The different numbers of RBs for LTE and NR for a given bandwidth causes a problem when RB utilization is calculated. Normally, RB utilization is calculated as the number of used RBs divided by the total number of RBs available. For LTE and NR clean carrier, there is no ambiguity about the number of available RBs in a slot. It is 50 for LTE and 52 for NR for 10 MHz. However, it is not straight forward to define the number of available RBs in a slot in case of spectrum sharing. For LTE users, the number of available RBs in a slot is 50 for 10 Mhz. But for NR users, the number of available RBs in a slot is 52. Thus, it is tricky to calculate RB utilization for spectrum sharing.

One approach is to use NR bandwidth, e.g., 52 RBs for 10 MHz, as the number of available RBs in a slot. Of course, this causes error since there are not 52 RBs for LTE users.

Another approach is to calculate LTE utilization assuming 50 available RBs and NR utilization assuming 52 available RBs at 10 MHz. The sum of LTE and NR utilization is used to represent the cell RB utilization. This approach is better than the first approach, but is still not accurate for all cases. When all RBs in a slot are used by LTE and NR users, the calculated utilization may be slightly smaller or greater than 100%.

Various embodiments of inventive concepts determine the number of available RBs based on the RB grid instead of just the number of RBs available to LTE or NR and determine the number of available RBs based on RB resource split for a given slot. The RB grid shows the mis-alignment between RBs for LTE and NR above DC subcarrier. This is important since using 1 LTE RB above DC subcarrier can block 2 NR RBs.

According to some embodiments of inventive concepts, a method performed by a processor of a network device in a network that incorporates spectrum sharing to determine a number of available resource blocks, RBs, in a time slot of a spectrum of a given bandwidth includes determining whether or not the slot is assigned to long term evolution, LTE, and new radio, NR. The method further includes responsive to the slot being assigned to LTE and NR and starts from a low frequency with NR and ends at a high frequency with LTE with a number of RB segments being assigned to LTE and NR, and the RB segment at a lowest part of the spectrum being assigned to NR and the RB segment at a highest part of the spectrum being assigned to LTE: responsive to a number m of LTE segments crossing or being above a DC subcarrier, determining that the number of available RBs in the slot is A+p−(m−1), or B−p−(m−1), where A is LTE cell channel bandwidth in a unit of RB and B is NR cell channel bandwidth in a unit of RB and p is the number based on a cell channel bandwidth of the spectrum.

Various advantages that may be achieved enable calculation of accurate RB utilization, which is a key performance indicator for operators and thus can be important for operators.

According to other embodiments of inventive concepts, a method performed by a processor of a network device in a network that incorporates spectrum sharing to determine a number of available resource blocks, RBs, in a time slot of a spectrum of a given bandwidth includes determining whether or not the slot is assigned to long term evolution, LTE, and new radio, NR. The method further includes responsive to the slot being assigned to LTE and NR and NR and starts from a low frequency with NR and ends at a high frequency with NR with a number of RB segments being assigned to LTE and NR, and the RB segment at the lowest part of the spectrum being assigned to NR, and the RB segment at the highest part of the spectrum being assigned to NR: responsive to a number m of LTE segments crossing or being above a DC subcarrier, determining that the number of available RBs in the slot is B−m, where B is NR cell channel bandwidth in a unit of RB.

According to other embodiments of inventive concepts, a method performed by a processor of a network device in a network that incorporates spectrum sharing to determine a number of available resource blocks, RBs, in a time slot of a spectrum of a given bandwidth includes determining whether or not the slot is assigned to long term evolution, LTE, and new radio, NR. The method further includes responsive to the slot being assigned to LTE and NR and starts from a low frequency with LTE with an RB segment at a lowest part of the spectrum being assigned to LTE and determining whether the RB segment at a highest part of the spectrum is assigned to LTE or NR: responsive to the RB segment at the highest part of the spectrum being assigned to NR and a number m of LTE RB segments crossing or being above a DC subcarrier, determining that the number of available RBs in the slot is A+p−m, or B−p−m, where A is LTE cell channel bandwidth in a unit of RB and B is NR cell channel bandwidth in a unit of RB and p is a number based on a cell channel bandwidth of the spectrum.

Radio Access Network (RAN) nodes and computer programs and computer program products having analogous recitations are also provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 19:
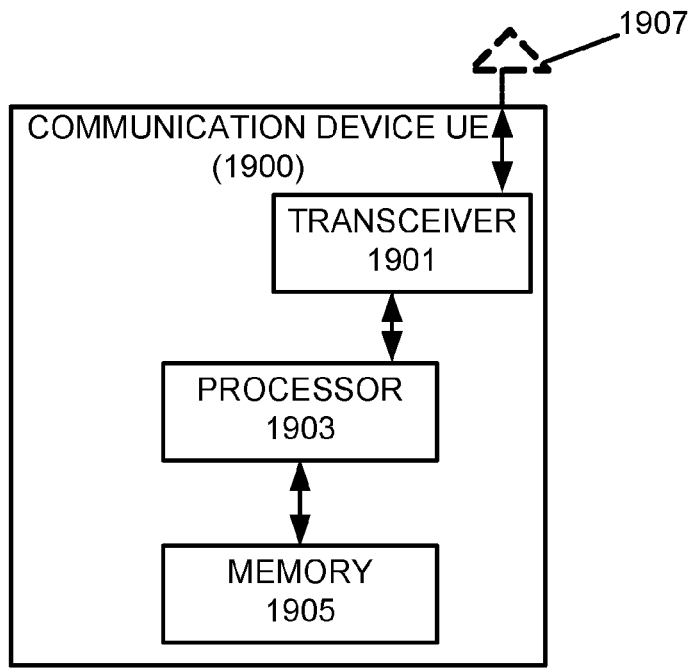
FIG. 19 is a block diagram illustrating a communication device UE according to some embodiments of inventive concepts.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

FIG. 19 is a block diagram illustrating elements of a communication device UE 1900 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. As shown, communication device UE may include an antenna 1907, and transceiver circuitry 1901 (also referred to as a transceiver) including a transmitter and a receiver configured to provide uplink and downlink radio communications with a base station(s) (also referred to as a RAN node) of a radio access network. Communication device UE may also include processing circuitry 1903 (also referred to as a processor) coupled to the transceiver circuitry, and memory circuitry 1905 (also referred to as memory) coupled to the processing circuitry. The memory circuitry 1905 may include computer readable program code that when executed by the processing circuitry 1903 causes the processing circuitry to perform operations according to embodiments disclosed herein. According to other embodiments, processing circuitry 1903 may be defined to include memory so that separate memory circuitry is not required. Communication device UE may also include an interface (such as a user interface) coupled with processing circuitry 1903, and/or communication device UE may be incorporated in a vehicle.

As discussed herein, operations of communication device UE may be performed by processing circuitry 1903 and/or transceiver circuitry 1901. For example, processing circuitry 1903 may control transceiver circuitry 1901 to transmit communications through transceiver circuitry 1901 over a radio interface to a radio access network node (also referred to as a base station) and/or to receive communications through transceiver circuitry 1901 from a RAN node over a radio interface. Moreover, modules may be stored in memory circuitry 1905, and these modules may provide instructions so that when instructions of a module are executed by processing circuitry 1903, processing circuitry 1903 performs respective operations (e.g., operations discussed below with respect to Example Embodiments relating to wireless communication devices). According to some embodiments, a communication device UE 1900 and/or an element(s)/function(s) thereof may be embodied as a virtual node/nodes and/or a virtual machine/machines.

Figure 20:
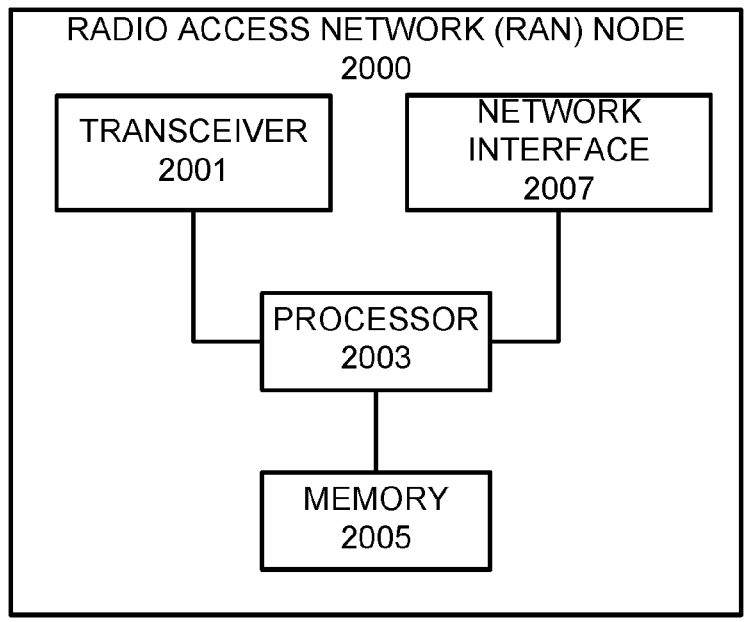
FIG. 20 is a block diagram illustrating a radio access network RAN node (e.g., a base station eNB/gNB) according to some embodiments of inventive concepts.

FIG. 20 is a block diagram illustrating elements of a radio access network RAN node 2000 (also referred to as a network node, base station, eNodeB/eNB, gNodeB/gNB, etc.) of a Radio Access Network (RAN) configured to provide cellular communication according to embodiments of inventive concepts. As shown, the RAN node may include transceiver circuitry 2001 (also referred to as a transceiver) including a transmitter and a receiver configured to provide uplink and downlink radio communications with mobile terminals. The RAN node may include network interface circuitry 2007 (also referred to as a network interface) configured to provide communications with other nodes (e.g., with other base stations) of the RAN and/or core network CN. The network node may also include processing circuitry 2003 (also referred to as a processor) coupled to the transceiver circuitry, and memory circuitry 2005 (also referred to as memory) coupled to the processing circuitry. The memory circuitry 2005 may include computer readable program code that when executed by the processing circuitry 2003 causes the processing circuitry to perform operations according to embodiments disclosed herein. According to other embodiments, processing circuitry 2003 may be defined to include memory so that a separate memory circuitry is not required.

As discussed herein, operations of the RAN node may be performed by processing circuitry 2003, network interface 2007, and/or transceiver 2001. For example, processing circuitry 2003 may control transceiver 2001 to transmit downlink communications through transceiver 2001 over a radio interface to one or more mobile terminals UEs and/or to receive uplink communications through transceiver 2001 from one or more mobile terminals UEs over a radio interface. Similarly, processing circuitry 2003 may control network interface 2007 to transmit communications through network interface 2007 to one or more other network nodes and/or to receive communications through network interface from one or more other network nodes. Moreover, modules may be stored in memory 2005, and these modules may provide instructions so that when instructions of a module are executed by processing circuitry 2003, processing circuitry 2003 performs respective operations (e.g., operations discussed below with respect to Example Embodiments relating to RAN nodes). According to some embodiments, RAN node 2000 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 21:
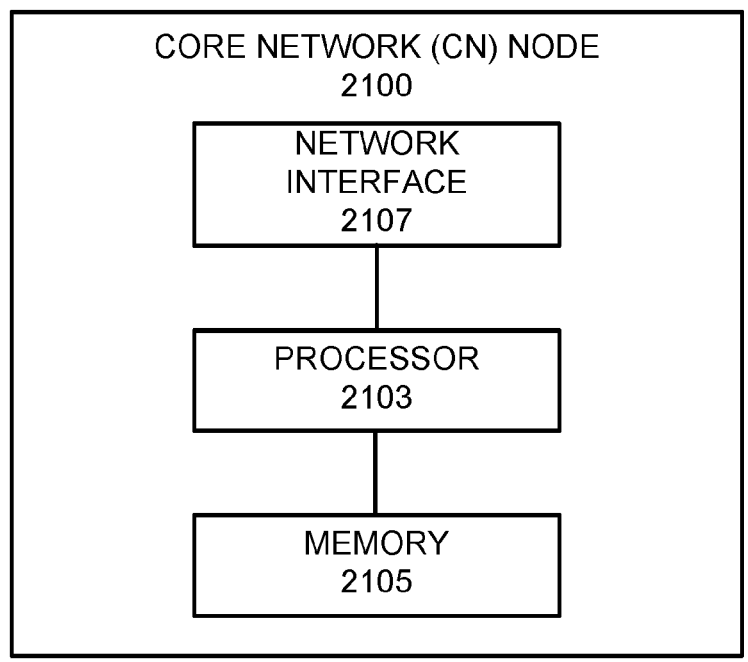
FIG. 21 is a block diagram illustrating a core network CN node (e.g., an AMF node, an SMF node, etc.) according to some embodiments of inventive concepts.

FIG. 21 is a block diagram illustrating elements of a core network CN node (e.g., an SMF node, an AMF node, etc.) of a communication network configured to provide cellular communication according to embodiments of inventive concepts. As shown, the CN node may include network interface circuitry 2107 (also referred to as a network interface) configured to provide communications with other nodes of the core network and/or the radio access network RAN. The CN node may also include a processing circuitry 2103 (also referred to as a processor) coupled to the network interface circuitry, and memory circuitry 2105 (also referred to as memory) coupled to the processing circuitry. The memory circuitry 2105 may include computer readable program code that when executed by the processing circuitry 2103 causes the processing circuitry to perform operations according to embodiments disclosed herein. According to other embodiments, processing circuitry 2103 may be defined to include memory so that a separate memory circuitry is not required.

As discussed herein, operations of the CN node may be performed by processing circuitry 2103 and/or network interface circuitry 2107. For example, processing circuitry 2103 may control network interface circuitry 2107 to transmit communications through network interface circuitry 2107 to one or more other network nodes and/or to receive communications through network interface circuitry from one or more other network nodes. Moreover, modules may be stored in memory 2105, and these modules may provide instructions so that when instructions of a module are executed by processing circuitry 2103, processing circuitry 2103 performs respective operations (e.g., operations discussed below with respect to Example Embodiments relating to core network nodes). According to some embodiments, CN node 2100 and/or an element(s)/function(s) thereof may be embodied as a virtual node/nodes and/or a virtual machine/machines.

As previously discussed, the different numbers of RBs for LTE and NR for a given bandwidth causes a problem when RB utilization is calculated. Normally, RB utilization is calculated as the number of used RBs divided by the total number of RBs available. For LTE and NR clean carrier, there is no ambiguity about the number of available RBs in a slot. It is 50 for LTE and 52 for NR for 10 MHz. However, it is not straight forward to define the number of available RBs in a slot in case of spectrum sharing. For LTE users, the number of available RBs in a slot is 50 for 10 Mhz. But for NR users, the number of available RBs in a slot is 52. Thus, it is tricky to calculate RB utilization for spectrum sharing.

Using NR bandwidth, (e.g. 52 RBs for 10 MHz) as the number of available RBs in a slot causes error since there are not 52 RBs for LTE users. The approach of calculating LTE utilization assuming 50 available RBs and NR utilization assuming 52 available RBs where the sum of LTE and NR utilization is used to represent the cell RB utilization is better than the first one, but still not accurate for all cases. When all RBs in a slot are used by LTE and NR users, the calculated utilization may be slightly smaller or greater than 100%.

Various embodiments of inventive concepts enable calculation of accurate RB utilization, which is a key performance indicator for operators and thus can be important for operators.

The number of available RBs in a slot can vary, and the number is determined based on how the RB resources are split in the slot. In the description that follows, the following definitions shall be used:

A=the number of available RBs in a slot for LTE for a given bandwidth. For example, A=50 for 10 MHz bandwidth, 75 for 15 MHz bandwidth or 100 for 20 MHz bandwidth.

B=the number of available RBs in a slot for NR for a given bandwidth. For example, B=52 for 10 MHz bandwidth, 79 for 15 MHz bandwidth or 106 for 20 MHz bandwidth.

For the above examples of A and B values for the above bandwidths, one can indicate B=A+2*p where p=1 for 10 MH bandwidth, 2 for 15 MHz bandwidth and 3 for 20 MHz bandwidth.

Figure 4:
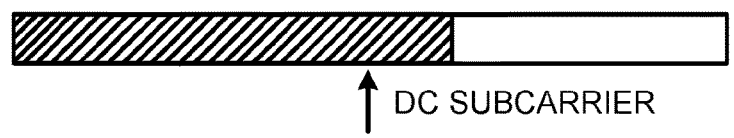
FIG. 4 is an illustration of an example of the resource block assignment of FIG. 3 where there is only one LTE segment that crosses or is above a DC subcarrier according to some embodiments of inventive concepts.

In the various embodiments of inventive concepts described herein, RB allocation is done at the RB level. Before any determining how many RBs are available, a network node decides how to divide RB resources between LTE and NR in a slot if they both have demand There are many ways to do this. A few options are listed below Option 1. In this option, a number of contiguous RBs from the lower part of the spectrum are assigned to NR and a number of contiguous RBs from the remaining part of the spectrum are assigned to LTE. This option is illustrated in FIG. 4. When a number of RBs are assigned to NR, it means those RBs are allowed to be used by NR users or NR UEs (user equipments). Please note RBs assigned to NR may or may not be fully utilized by NR. The same applies to RBs assigned to LTE.

Figure 8:
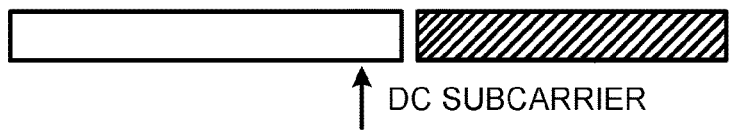
FIG. 8 is an illustration of an example of the resource block assignment of FIG. 7 where there is only one NR segment and one LTE segment and the LTE segment crosses a DC subcarrier according to some embodiments of inventive concepts.

Option 2. In this option, a number of contiguous RBs from the lower part of the spectrum are assigned to LTE and a number of contiguous RBs from the remaining part of the spectrum are assigned to NR. This option is illustrated in FIG. 8.

Figure 12:
FIG. 12 is an illustration of an example of the resource block assignment of FIG. 11 where there is one LTE segment in between the NR segments and is cross or above a DC subcarrier according to some embodiments of inventive concepts.

Option 3. In this option, a number of contiguous RBs from a middle part of the spectrum are assigned to LTE while a lower part of the spectrum and an upper part of the spectrum are assigned to NR. This option is illustrated in FIG. 12.

Figure 3:
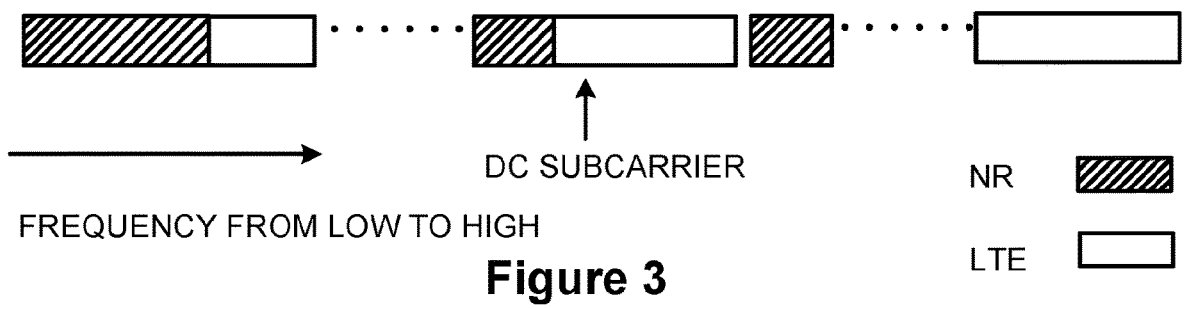
FIG. 3 is an illustration of a resource block assignment in a slot that starts with NR and ends with LTE and where there may be LTE/NR segments in between the start and end according to some embodiments of inventive concepts.

Option 4. In this option, a number of contiguous RBs are assigned from a low frequency with NR and ends with a number of contiguous RBs at a high frequency with LTE and there may be numerous LTE/NR segments in between. This option is illustrated in FIG. 3. Option 1 is a case based on option 4.

Figure 7:
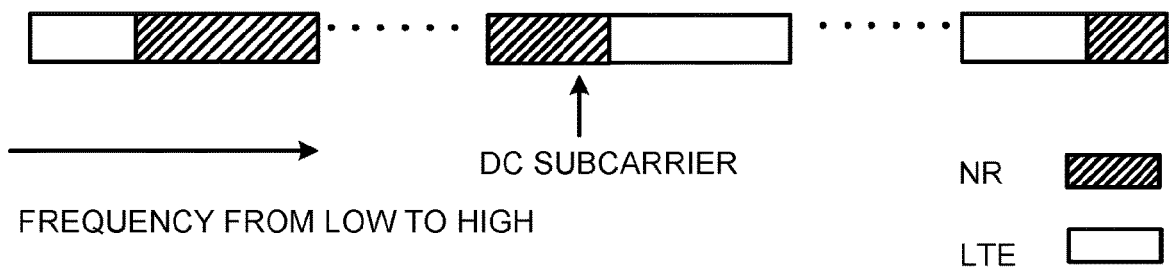
FIG. 7 is an illustration of a resource block assignment in a slot that starts with LTE and ends with NR and where there may be LTE/NR segments in between the start and end according to some embodiments of inventive concepts.

Option 5. In this option, a number of contiguous RBs are assigned from a low frequency with LTE and ends with a number of contiguous RBs at a high frequency with NR and there may be numerous LTE/NR segments in between. This option is illustrated in FIG. 7. Option 2 is a case based on option 5.

Figure 11:
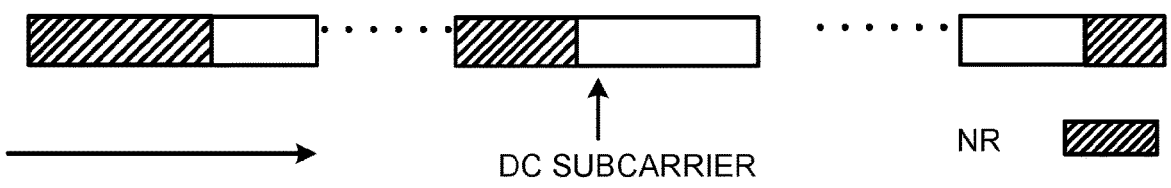
FIG. 11 is an illustration of a resource block assignment in a slot that starts with NR and ends with NR and where there may be LTE/NR segments in between the start and end and there are m LTE segments that cross or are above a DC subcarrier according to some embodiments of inventive concepts.

Option 6. In this option, a number of contiguous RBs are assigned to NR at both ends of the spectrum and there may be numerous LTE/NR segments in between. This option is illustrated in FIG. 11. Option 3 is a case based on option 6.

Figure 15:
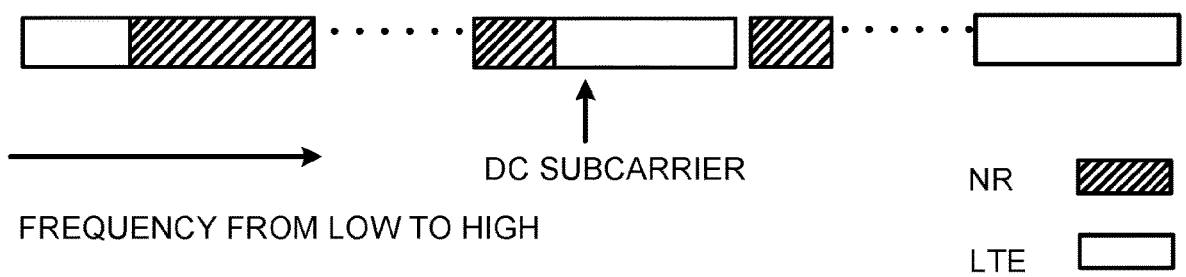
FIG. 15 is an illustration of a resource block assignment in a slot that starts with LTE and ends with LTE and where there may be LTE/NR segments in between the start and end and there are m LTE segments that cross or are above a DC subcarrier according to some embodiments of inventive concepts.

Option 7. In this option, a number of contiguous RBs are assigned to LTE at both ends of the spectrum and there may be numerous LTE/NR segments in between. This option is illustrated in FIG. 15.

For each slot, the network node determine if the slot is assigned to LTE only, or NR only, or to both LTE and NR. If the slot is assigned to both LTE and NR, the network node determines how many RBs will be assigned to NR and how many RBs will be assigned to LTE.

If a slot is assigned to LTE only, then the number of available RBs in the slot is based on LTE bandwidth. That is, the number of available RB in the slot is 50 for 10 MHz bandwidth, 75 for 15 MHz bandwidth, or 100 for 20 MHz bandwidth.

If a slot is assigned to NR only, then the number of available RBs in the slot is based on NR bandwidth. That is, the number of available RB in the slot is 52 for 10 MHz bandwidth, 79 for 15 MHz bandwidth, or 106 for 20 MHz bandwidth.

Figure 1:
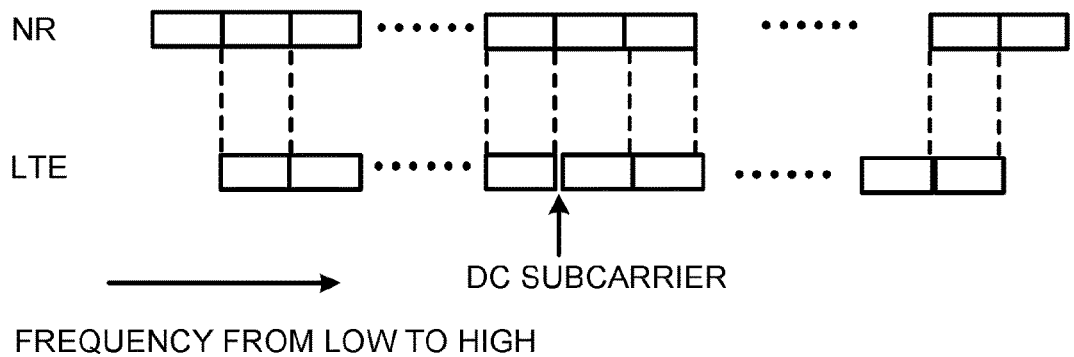
FIG. 1 is an illustration of a resource block grid for LTE and NR in a 10 MHz cell with spectrum sharing.
Figure 2:
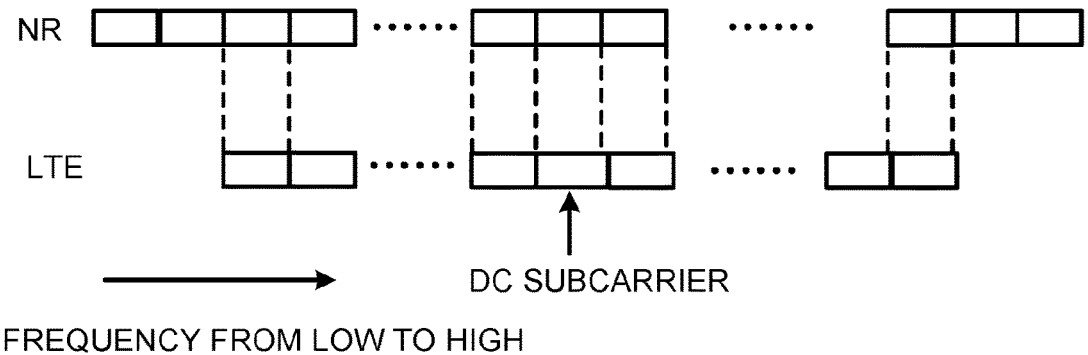
FIG. 2 is an illustration of a resource block grid for LTE and NR in a 15 MHz cell with spectrum sharing.

The number of available RBs in the slot is based the RB grid, illustrated in FIGS. 1 and 2, and the way the RB resources are divided between LTE and NR as illustrated in FIGS. 1-18.

If option 1 is used where the NR region is at the lower part of the spectrum and the remaining part of the spectrum is assigned to LTE (see FIG. 4), then the network node determines that the number of available RBs in the slot is A+p or B−p.

If option 2 is used where the LTE region is at the lower part of the spectrum and the remaining part of the spectrum is assigned to NR (see FIG. 7), then the number of available RBs in the slot depends on the number of RBs assigned to LTE. Specifically, if the number of RBs assigned to LTE is not greater than floor (A/2), then the network node determines that the number of available RBs in the slot is A+p. Otherwise, the number of available RBs in the slot is A+p−1.

If option 3 is used where a number of contiguous RBs from a middle part of the spectrum are assigned to LTE while a lower part of the spectrum and an upper part of the spectrum are assigned to NR, the number of available RBs depends on whether the middle part of the spectrum includes a RB that includes a subcarrier above the DC subcarrier. If the middle part of the spectrum includes a RB that includes a subcarrier above the DC subcarrier (see FIG. 12), then the network node determines that the number of available RBs in the slot is B−1. However, if the middle part of the spectrum does not include a RB that includes a subcarrier above the DC subcarrier (See FIG. 14), then the network node determines that the number of available RBs in the slot is B. In some embodiments, the range of the middle part of the spectrum may be dynamically specified. In these embodiments, the network node obtains the starting point and the ending point of the middle part of the spectrum.

If option 4 is used where a number of contiguous RBs are assigned from a low frequency with NR and ends with a number of contiguous RBs at a high frequency with LTE and where there may be numerous LTE/NR segments in between as illustrated in FIGS. 3-6, then the network node determines how many LTE segments cross the DC subcarrier or are above the DC subcarrier. When there are m LTE segments that cross the DC subcarrier or are above the DC subcarrier, the network node determines that the number of available RBs is A+p−(m−1), or B−p−(m−1). In the case where there are only two RB segments, the NR segment is at the lower spectrum while the LTE segment is at the higher spectrum. The LTE segment either cross the DC subcarrier or is above the DC subcarrier, which means m=1. The network node determines that the number of available RBs is A+p or B−p. This is basically the option 1.

FIG. 4 illustrates a scenario where there is only one LTE segment and one NR segment where the LTE segment is above the DC subcarrier. In this scenario, the network node determines that the number of available RBs would be A+p−(1−1)=A+p.

Figure 5:
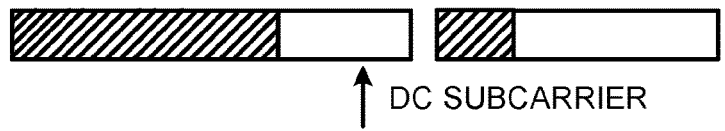
FIG. 5 is an illustration of an example of the resource block assignment of FIG. 3 where there are two LTE segments that cross or are above a DC subcarrier according to some embodiments of inventive concepts.

FIG. 5 illustrates a scenario where there are two LTE segments with one LTE segment crossing the DC subcarrier and one LTE segment above the DC subcarrier. In this scenario, the network node determines that the number of available RBs would be A+p−(2−1)=A+p−1.

Figure 6:
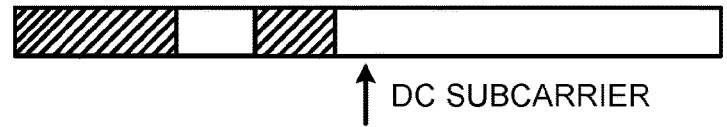
FIG. 6 is an illustration of an example of the resource block assignment of FIG. 3 where there are two LTE segments with only one LTE segment crossing or being above a DC subcarrier according to some embodiments of inventive concepts.

FIG. 6 illustrates a scenario where there are two LTE segments with one LTE segment crossing the DC subcarrier and one LTE segment below the DC subcarrier. In this scenario, the network node determines that the number of available RBs would be A+p−(1−1)=A+p.

If option 5 is used where a number of contiguous RBs are assigned from a low frequency with LTE and ends with a number of contiguous RBs at a high frequency with NR and where there may be numerous LTE/NR segments in between as illustrated in FIGS. 7-10, then the network node determines how many LTE segments cross the DC subcarrier or are above the DC subcarrier. When there are m LTE segments that cross the DC subcarrier or are above the DC subcarrier, the network node determines that the number of available RBs is A+p−m, or B−p−m.

FIG. 8 illustrates a scenario where there is only one LTE segment and one NR segment where the LTE segment crosses the DC subcarrier. In this scenario, the network node determines that the number of available RBs would be A+p−1.

Figure 9:
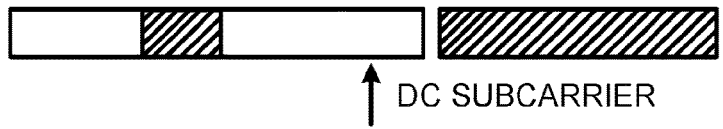
FIG. 9 is an illustration of an example of the resource block assignment of FIG. 7 where there are two LTE segments but only one crosses or is above a DC subcarrier according to some embodiments of inventive concepts.

FIG. 9 illustrates a scenario where there are two LTE segments with only one LTE segment crossing the DC subcarrier. In this scenario, the network node determines that the number of available RBs would be A+p−1.

Figure 10:
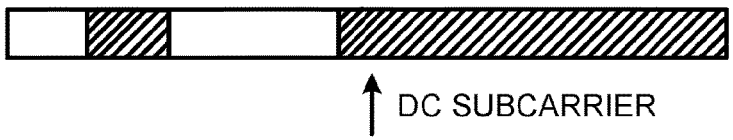
FIG. 10 is an illustration of an example of the resource block assignment of FIG. 7 where there are two LTE segments but neither LTE segment crosses or is above a DC subcarrier according to some embodiments of inventive concepts.

FIG. 10 illustrates a scenario where there are two LTE segments with neither LTE segment crossing the DC subcarrier or is above the DC subcarrier. In this scenario, the network node determines that the number of available RBs would be A+p.

If option 6 is used where a number of contiguous RBs are assigned to NR at both ends of the spectrum and there may be numerous LTE/NR segments in between as illustrated in FIGS. 11-14, then the network node determines how many LTE segments cross the DC subcarrier or are above the DC subcarrier. When there are m LTE segments that cross the DC subcarrier or are above the DC subcarrier, the network node determines that the number of available RBs is B−m.

FIG. 12 illustrates a scenario where there is only one LTE segment and the LTE segment crosses the DC subcarrier. In this scenario, the network node determines that the number of available RBs would be B−1.

Figure 13:
FIG. 13 is an illustration of an example of the resource block assignment of FIG. 11 where there are two LTE segments that cross or above a DC subcarrier according to some embodiments of inventive concepts.

FIG. 13 illustrates a scenario where there are two LTE segments with one LTE segment crossing the DC subcarrier and one LTE segment above the DC subcarrier. In this scenario, the network node determines that the number of available RBs would be B−2.

Figure 14:
FIG. 14 is an illustration of an example of the resource block assignment of FIG. 11 where there is one LTE segment in between the NR segments and is below a DC subcarrier according to some embodiments of inventive concepts.

FIG. 14 illustrates a scenario where there is one LTE segment that does not cross the DC subcarrier and is below the DC subcarrier. In this scenario, the network node determines that the number of available RBs would be B. The scenario in FIG. 14 is the same scenario as one of the scenarios of option 3.

If option 7 is used where there are a number of contiguous RBs assigned to LTE at both ends of the spectrum and where there may be numerous LTE/NR segments in between as illustrated in FIGS. 15-18, then the network determines how many LTE segments cross the DC subcarrier or are above the DC subcarrier. When there are m LTE segments that cross the DC subcarrier or are above the DC subcarrier, the network node determines that the number of available RBs is A−(m−1).

Figure 16:
FIG. 16 is an illustration of an example of the resource block assignment of FIG. 15 where there are two LTE segments that cross or above a DC subcarrier according to some embodiments of inventive concepts.

FIG. 16 illustrates a scenario where there are two LTE segments and one of the LTE segments crosses the DC subcarrier and the other LTE segment is above the DS subcarrier. In this scenario, the network node determines that the number of available RBs would be A−(2−1)=A−1.

Figure 17:
FIG. 17 is an illustration of an example of the resource block assignment of FIG. 15 where there are three LTE segments that cross or above a DC subcarrier according to some embodiments of inventive concepts.

FIG. 17 illustrates a scenario where there are three LTE segments with one LTE segment crossing the DC subcarrier and two LTE segments above the DC subcarrier. In this scenario, the network node determines that the number of available RBs would be A−(3−1)=A−2.

Figure 18:
FIG. 18 is an illustration of an example of the resource block assignment of FIG. 15 where there is one LTE segment that crosses or is above a DC subcarrier according to some embodiments of inventive concepts.

FIG. 18 illustrates a scenario where there are three LTE segments where two of the LTE segments are below the DC subcarrier and one of the LTE segments is above the DS subcarrier. In this scenario, the network node determines that the number of available RBs would be A−(1−1)=A.

When the number of available RBs is determined using the various embodiments of inventive concepts described herein, the RB utilization will be 100% when all RBs are used in a slot.

For example, at 10 MHz and option 1 is used for RB resource divide, a slot will be shared by LTE and NR, then the number of available RBs is 51 (50+1 or 52−1). When NR uses, e.g., 40 RBs from the lower part of the spectrum and LTE uses the 11 remaining RBs available for LTE, the RB utilization in the slot is (40+11)/51=100%.

For comparison, the RB utilization with the current two approaches shall be calculated. For the first approach, the number of available RBs is determined based on NR bandwidth. So the calculated RB utilization is (40+11)/52=98%. For the second approach, the calculated RB utilization is 40/50+11/52=101%. Thus, neither of the two approaches is accurate.

For another example at 10 MHz, option 2 shall be used for RB resource divide. For a slot shared by LTE and NR and assume that the number of RBs assigned to LTE is 39. Since 39>floor(50/2), the available RBs is 50+1−1=50. When LTE uses 39 RBs from the lower part of the spectrum, there are only 11 RBs can be used by NR. If NR uses those 11 remaining RBs, the RB utilization in the slot is (39+11)/50=100%.

For comparison, the RB utilization with the current two approaches shall be calculated. For the first approach, the number of available RBs is determined based on NR bandwidth. So the calculated RB utilization is (39+11)/52=96%. For the second approach, the calculated RB utilization is 39/50+11/52=99%. Thus, neither of the two approaches is accurate.

Operations of a RAN node 2000 (implemented using the structure of FIG. 20) will now be discussed with reference to the flow charts of FIGS. 22-29 according to some embodiments of inventive concepts. For example, modules may be stored in memory 2005 of FIG. 20, and these modules may provide instructions so that when the instructions of a module are executed by respective RAN node processing circuitry 2003, processing circuitry 2003 performs respective operations of the flow chart.

Figure 22:
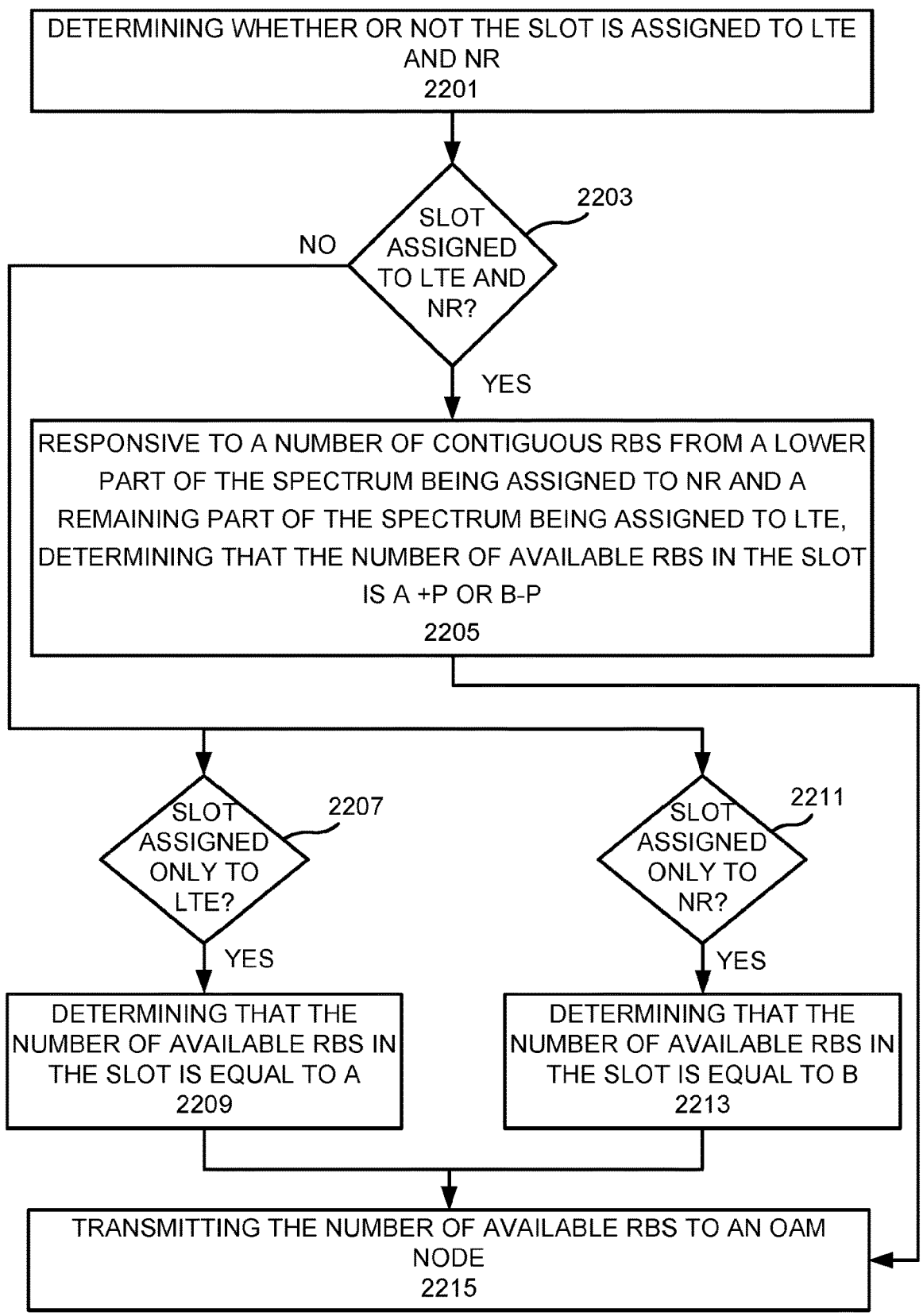
FIGS. 22-28 are flow charts illustrating operations of a network node according to some embodiments of inventive concepts.

Turning to FIG. 22, in block 2201, the processing circuitry 2003 determines whether or not the slot is assigned to LTE.

Responsive to the processing circuitry 2003 determining in block 2203 that the slot is assigned to LTE and NR, then the processing circuitry 2003, responsive to a number of contiguous RBs from a lower part of the spectrum being assigned to NR and a remaining part of the spectrum being assigned to LTE, determines in block 2205 that the number of available RBs in the slot is A+p or B−p, where A is LTE bandwidth in a unit of RB, B is NR bandwidth in a unit of RB, and p is a number based on a bandwidth of the spectrum. For example, A equals 50 for 10 MHz bandwidth, 75 for 15 MHz bandwidth or 100 for 20 MHz bandwidth, B equals 52 for 10 MHz, 79 for 15 MHz or 106 for 20 MHz, and p equals 1 for 10 MHz bandwidth, 2 for 15 MHz bandwidth and 3 for 20 MHz bandwidth.

In block 2215, the processing circuitry 2003 transmits the number of available RBs to an operations, administration, and maintenance (OAM) node.

Figure 23:
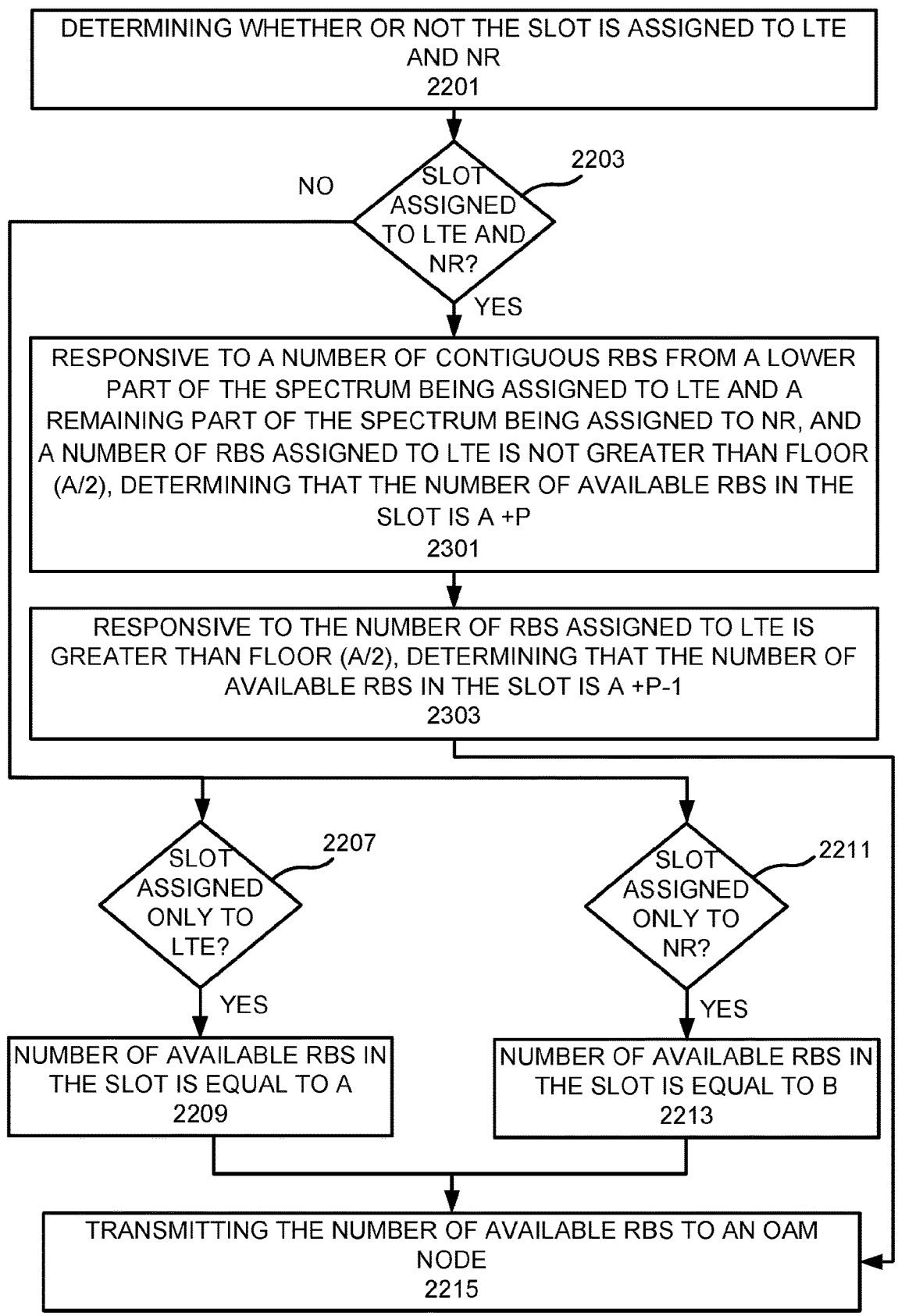

Turning to FIG. 23, responsive to the processing circuitry 2003 determining in block 2203 that the slot is assigned to LTE and NR, the processing circuitry 2003, responsive to a number of contiguous RBs from a lower part of the spectrum being assigned to LTE and a remaining part of the spectrum being assigned to NR, and a number of RBs assigned to LTE is not greater then floor (A/2), determines in block 2301 that the number of available RBs in the slot is A+p, where A is LTE bandwidth in a unit of RB and p is a number based on a bandwidth of the spectrum. For example, A equals 50 for 10 MHz bandwidth, 75 for 15 MHz bandwidth or 100 for 20 MHz bandwidth and p equals 1 for 10 MHz bandwidth, 2 for 15 MHz bandwidth and 3 for 20 MHz bandwidth.

The processing circuitry 2003, responsive to a number of contiguous RBs from the lower part of the spectrum being assigned to LTE and the remaining part of the spectrum being assigned to NR, and a number of RBs assigned to LTE is greater than floor (A/2), determines that the number of available RBs in the slot is A+p−1.

In block 2215, the processing circuitry 2003 transmits the number of available RBs to an operations, administration, and maintenance (OAM) node.

Figure 24A:
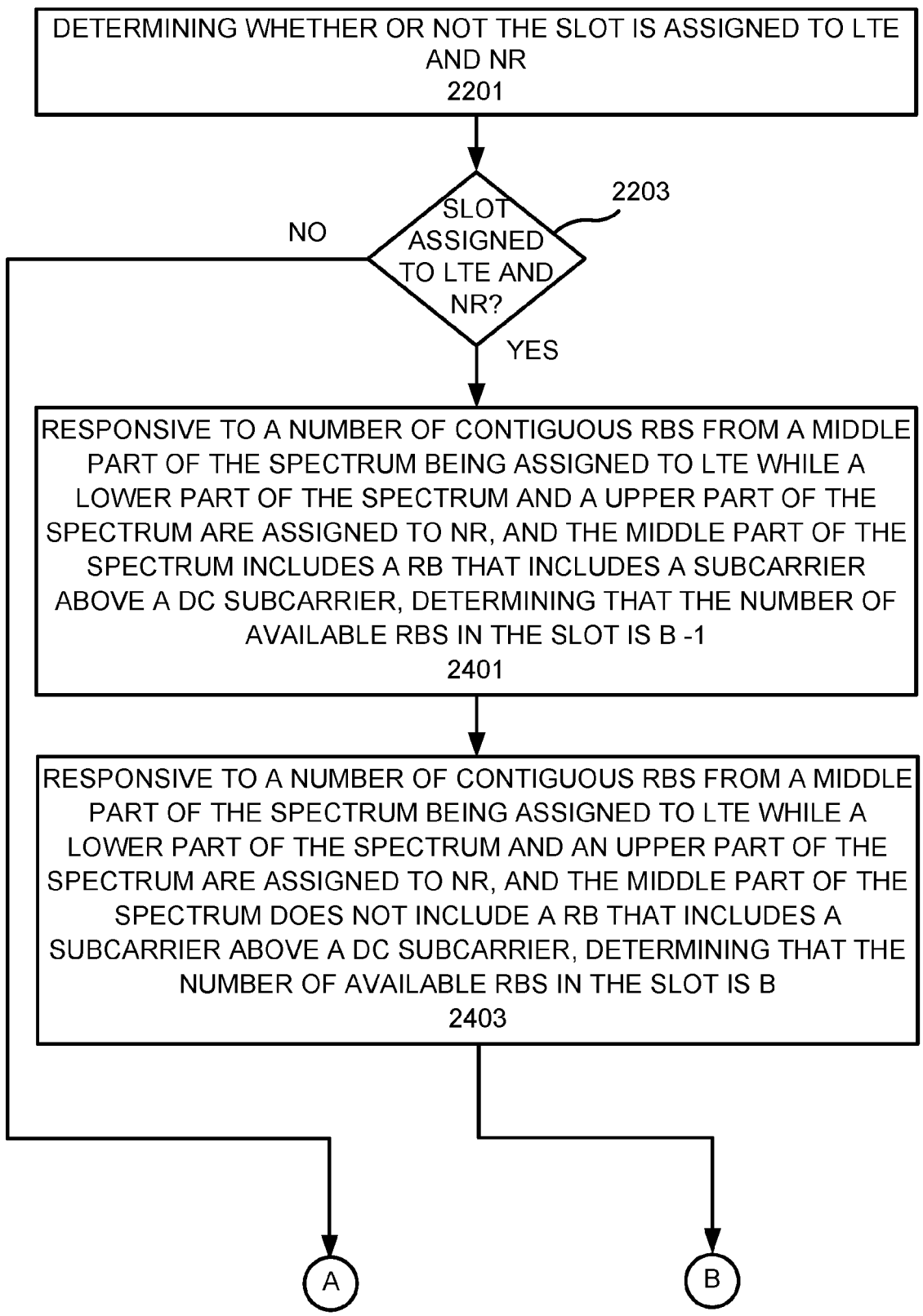
Figure 24B:
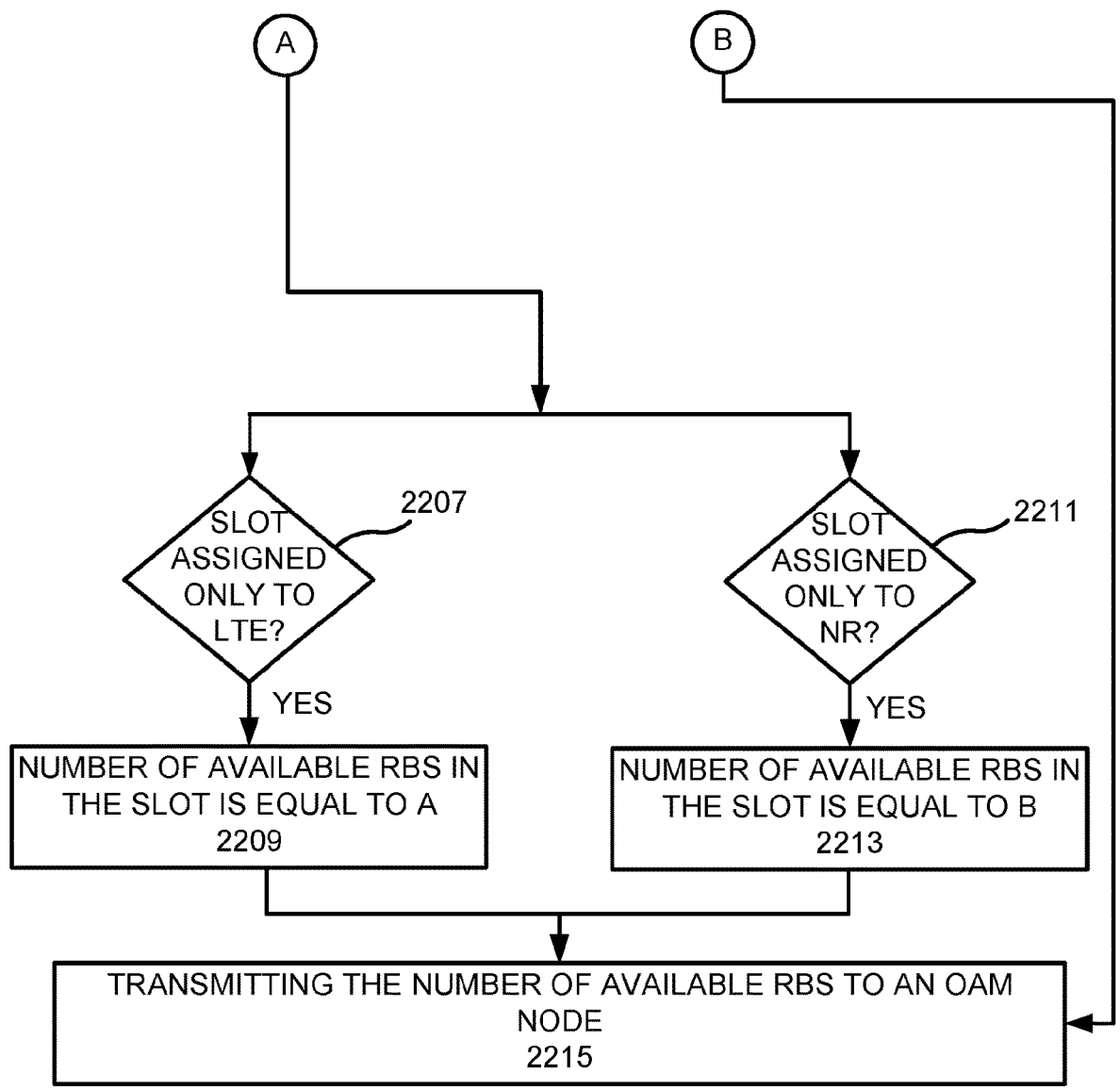

Turning to FIGS. 24A-24B, responsive to the processing circuitry 2003 determining in block 2203 that the slot is assigned to LTE and NR, the processing circuitry 2003, in block 2401, responsive to a number of contiguous RBs from a middle part of the spectrum being assigned to LTE while a lower part of the spectrum and an upper part of the spectrum are assigned to NR, and the middle part of the spectrum includes a RB that includes a subcarrier above a DC subcarrier, determines that the number of available RBs in the slot is B−1, where B is NR bandwidth in a unit of RB. For example, B equals 52 for 10 MHz bandwidth, 79 for 15 MHz bandwidth or 106 for 20 MHz bandwidth.

In block 2403, the processing circuitry 2003, responsive to a number of contiguous RBs from a middle part of the spectrum being assigned to LTE while a lower part of the spectrum and an upper part of the spectrum are assigned to NR, and the middle part of the spectrum does not include a RB that includes a subcarrier above a DC subcarrier, determines that the number of available RBs in the slot is B, where B is NR bandwidth in a unit of RB. For example, B equals 52 for 10 MHz bandwidth, 79 for 15 MHz bandwidth or 106 for 20 MHz bandwidth.

In block 2215, the processing circuitry 2003 transmits the number of available RBs to an operations, administration, and maintenance (OAM) node.

Figure 25:
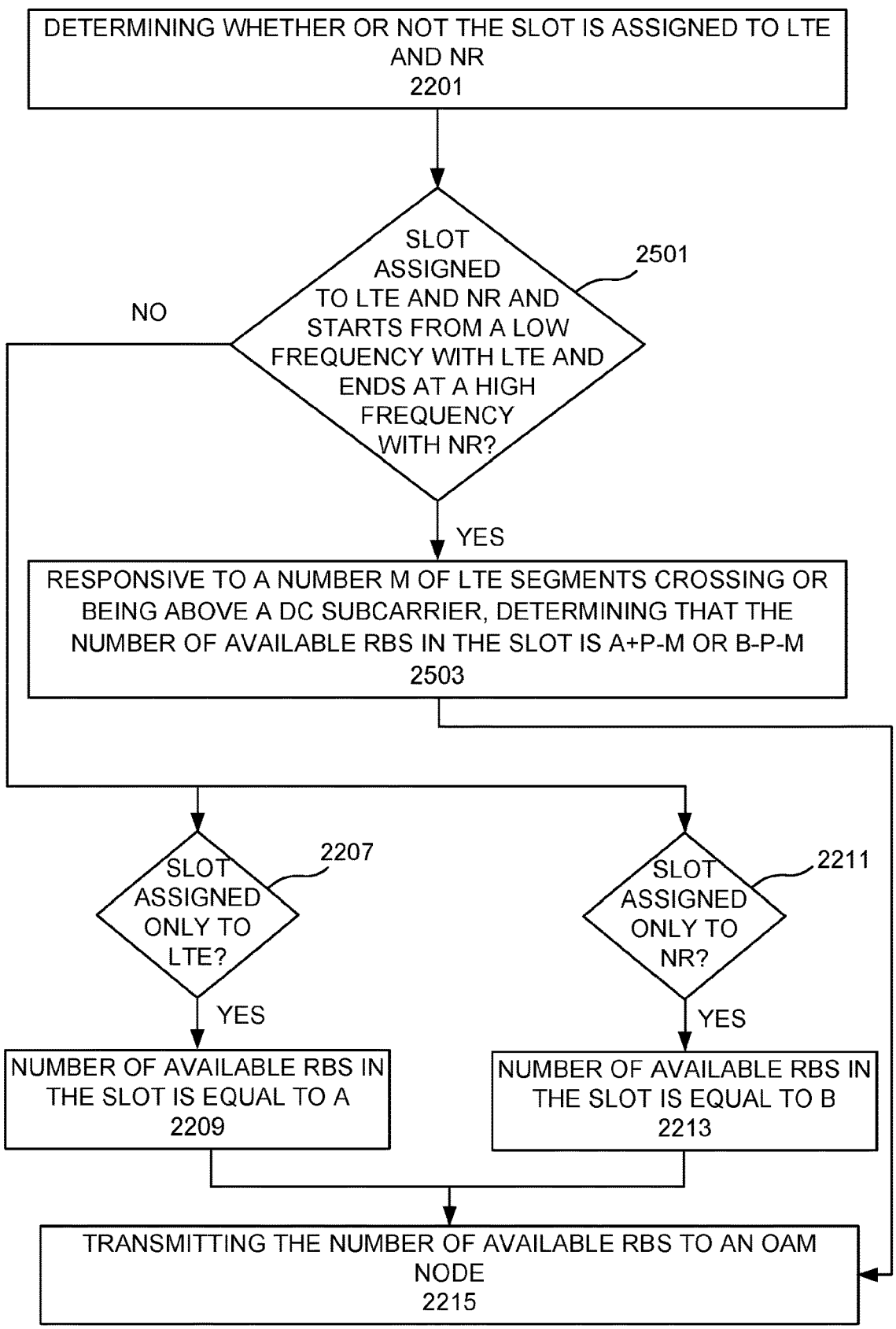

Turning to FIG. 25, responsive to the processing circuitry 2003 determining in block 2501 that the slot is assigned to LTE and NR and starts from a low frequency with LTE and ends at a high frequency with NR, the processing circuitry 2003, responsive to a number m of LTE segments crossing or being above a DC subcarrier, determines in block 2503 that the number of available RBs in the slot is A+p−m, where A is LTE bandwidth in a unit of RB and p is the number based on a bandwidth of the spectrum. For example, A equals 50 for 10 MHz bandwidth, 75 for 15 MHz bandwidth or 100 for 20 MHz bandwidth and p equals 1 for 10 MHz bandwidth, 2 for 15 MHz bandwidth and 3 for 20 MHz bandwidth.

In block 2215, the processing circuitry 2003 transmits the number of available RBs to an operations, administration, and maintenance (OAM) node.

Figure 26:
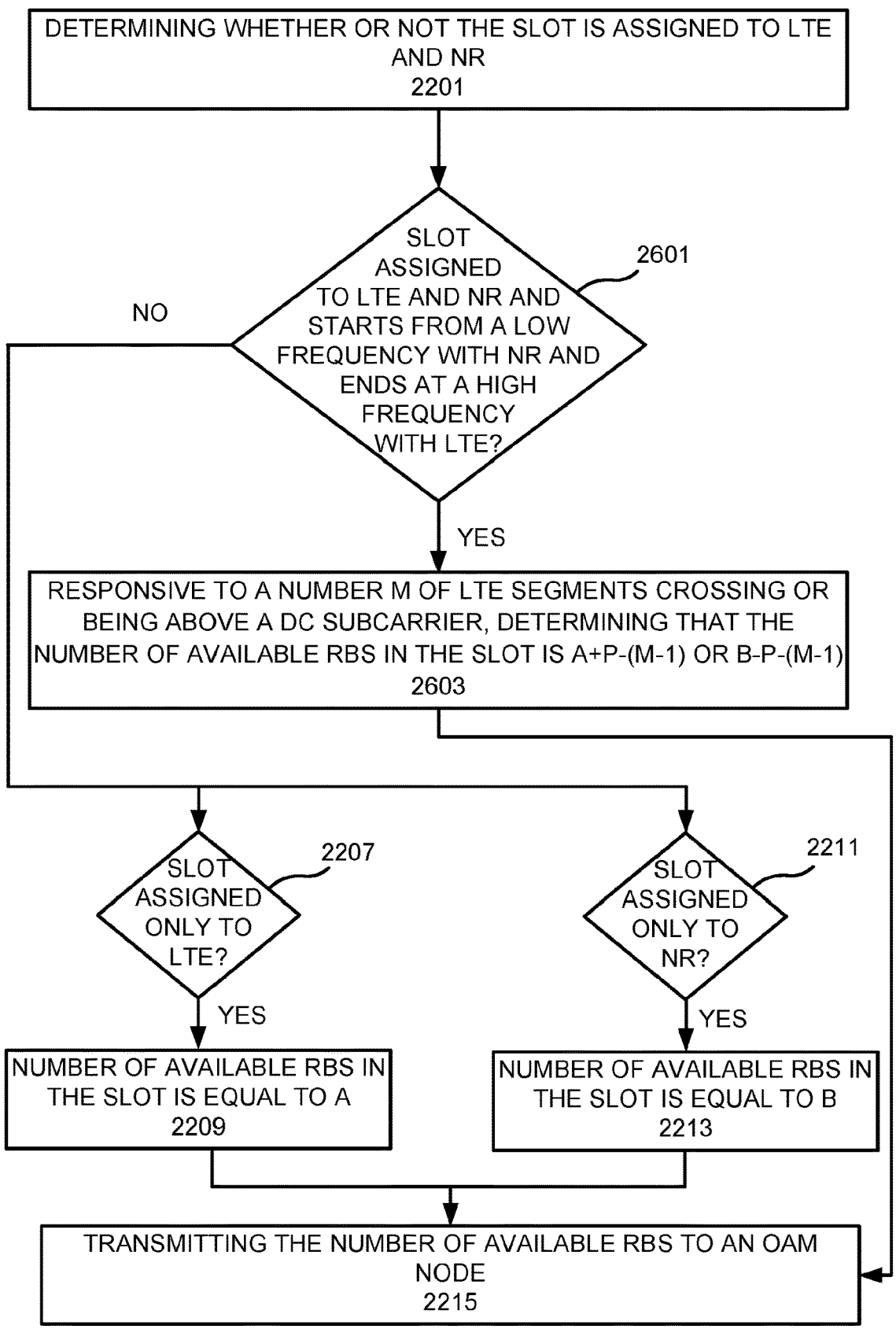

Turning to FIG. 26, responsive to the processing circuitry 2003 determining in block 2601 that the slot is assigned to LTE and NR and starts from a low frequency with NR and ends at a high frequency with LTE, the processing circuitry 2003, responsive to a number m of LTE segments crossing or being above a DC subcarrier, determines in block 2603 that the number of available RBs in the slot is A+p−(m−1), where A is LTE bandwidth in a unit of RB and p is the number based on a bandwidth of the spectrum. For example, A equals 50 for 10 MHz bandwidth, 75 for 15 MHz bandwidth or 100 for 20 MHz bandwidth and p equals 1 for 10 MHz bandwidth, 2 for 15 MHz bandwidth and 3 for 20 MHz bandwidth.

In block 2215, the processing circuitry 2003 transmits the number of available RBs to an operations, administration, and maintenance (OAM) node.

Figure 27:
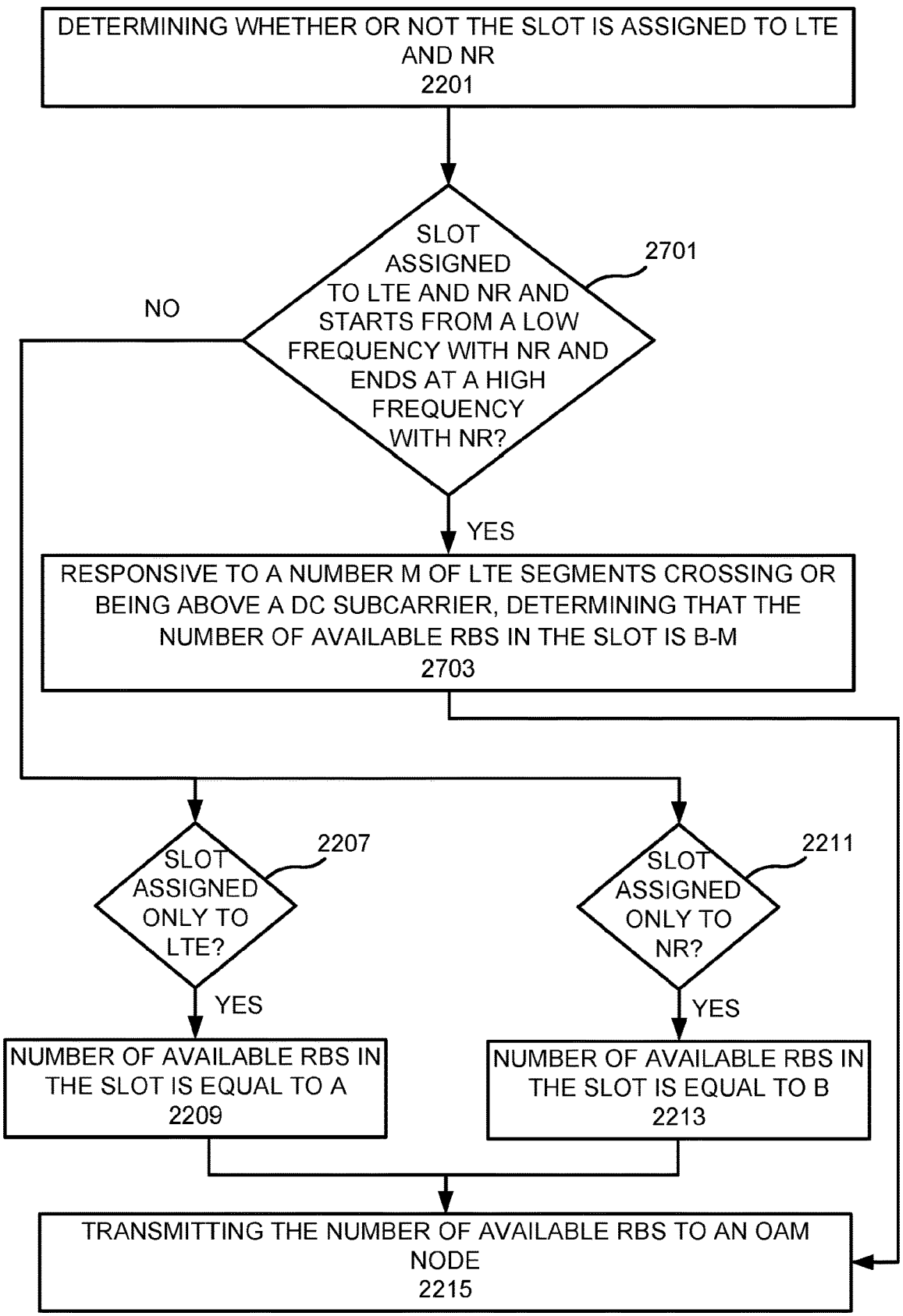

Turning to FIG. 27, responsive to the processing circuitry 2003 determining in block 2701 that the slot is assigned to LTE and NR and starts from a low frequency with NR and ends at a high frequency with LTE, the processing circuitry 2003, responsive to a number m of LTE segments crossing or being above a DC subcarrier, determines in block 2703 that the number of available RBs in the slot is B−m, where B is NR bandwidth in a unit of RB. For example, B equals 52 for 10 MHz bandwidth, 79 for 15 MHz bandwidth or 106 for 20 MHz bandwidth In block 2215, the processing circuitry 2003 transmits the number of available RBs to an operations, administration, and maintenance (OAM) node.

Figure 28:
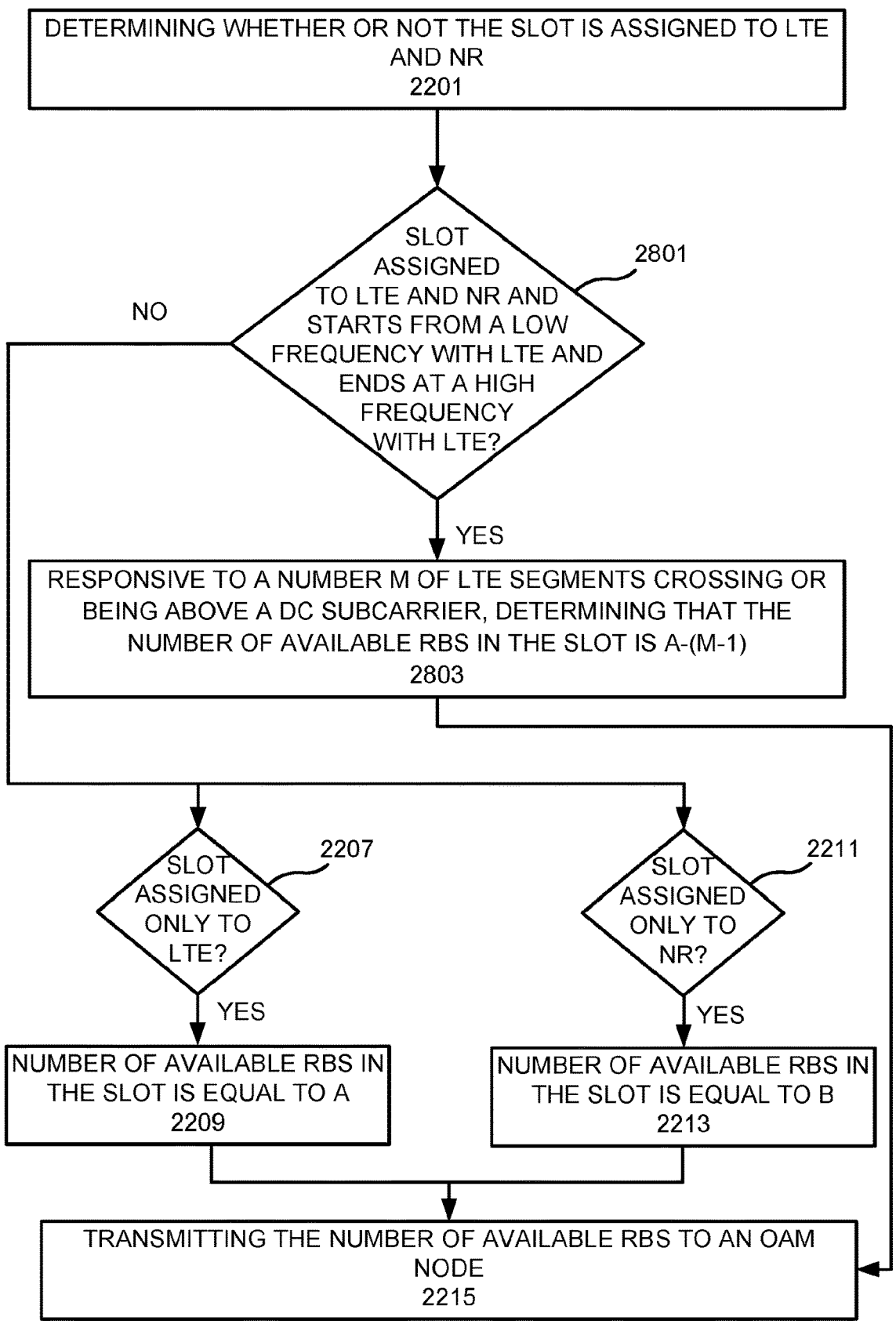

Turning to FIG. 28, responsive to the processing circuitry 2003 determining in block 2801 that the slot is assigned to LTE and NR and starts from a low frequency with LTE and ends at a high frequency with LTE, the processing circuitry 2003, responsive to a number m of LTE segments crossing or being above a DC subcarrier, determines in block 2803 that the number of available RBs in the slot is A−(m−1), where A is LTE bandwidth in a unit of RB. For example, A equals 50 for 10 MHz bandwidth, 75 for 15 MHz bandwidth or 100 for 20 MHz bandwidth.

In block 2215, the processing circuitry 2003 transmits the number of available RBs to an operations, administration, and maintenance (OAM) node.

If the slot is not assigned to LTE and NR, the processing circuitry 2003 determines whether the slot is assigned only to LTE in block 2207 or only to NR in block 2211.

Responsive to the slot being assigned only to LTE, the processing circuitry 2003 in block 2209 determines that the number of available RBs in the slot is equal to A. In block 2215, the processing circuitry 2003 transmits the number of available RBs to an operations, administration, and maintenance (OAM) node.

Responsive to the slot being assigned only to NR, the processing circuitry 2003 in block 2213 determines that the number of available RBs in the slot is equal to B. In block 2215, the processing circuitry 2003 transmits the number of available RBs to an operations, administration, and maintenance (OAM) node.

In some embodiments, the lower part of the spectrum comprises a range from a lowest RB to a dynamically specified RB. In these embodiments, the processing circuitry 2003 obtains the range of the lower part.

In some other embodiments, a range of the middle part of the spectrum is dynamically specified. In these embodiments, the processing circuitry 2003 obtains a starting point and an ending point of the middle part of the spectrum.

In further embodiments, the upper part of the spectrum comprises a range from a dynamically specified RB to a highest RB for the given bandwidth. In these embodiments, the processing circuitry 2003 obtains the range of the upper part of the spectrum.

In some embodiments, an RB segment consists of a number of contiguous RBs assigned either to LTE or NR.

In some other embodiments, the RB segment at the lowest part of the spectrum is the RB segment that includes the lowest RB among all RB segments assigned to both LTE and NR. When it is said that the RB segment at the lowest part of the spectrum is assigned to LTE (or NR), it means the same as the lower part of the spectrum is assigned to LTE (or NR).

In further embodiments, the RB segment at the highest part of the spectrum is the RB segment that includes the highest RB among all RB segments assigned to both LTE and NR. When it is said that the RB segment at the highest part of the spectrum is assigned to LTE (or NR), it means the same as the upper part of the spectrum is assigned to LTE (or NR).

Various operations from the flow charts of FIGS. 20-29 may be optional with respect to some embodiments of RAN nodes and related methods. Regarding methods of example independent embodiments 1, 16, 31, 46, 61, 76, and 91 (set forth below), for example, operations of blocks 2207-2213 of FIGS. 22-28 may be optional.

As can be seen from the foregoing, in cases of spectrum sharing, it is not easy to define the number of available RBs in a slot for RB utilization since LTE and NR have different numbers of available RBs given the same bandwidth. Existing solutions only look at the two numbers without considering RB grid and RB resource split in each slot.

Thus, the various embodiments of inventive concepts determine the number of available RBs based on the RB grid instead of just the number of RBs available to LTE or NR and determine the number of available RBs based on RB resource split for a given slot. The RB grid shows the mis-alignment between RBs for LTE and NR above DC subcarrier. This is important since using 1 LTE RB above DC subcarrier can block 2 NR RBs Example embodiments are discussed below.

EMBODIMENTS

Embodiment 1. A method performed by a processor of a network device in a network that incorporates spectrum sharing to determine a number of available resource blocks, RBs, in a time slot of a spectrum of a given bandwidth, the method comprising:
  determining (2201) whether or not the slot is assigned to long term evolution, LTE, and new radio, NR; and
  responsive (2203) to the slot being assigned to LTE and NR:
    responsive to a number of contiguous RBs from a lower part of the spectrum being assigned to NR and a remaining part of the spectrum being assigned to LTE, determining (2205) that the number of available RBs in the slot is A+p or B−p, where A is LTE bandwidth in a unit of RB, B is NR bandwidth in a unit of RB, and p is a number based on a bandwidth of the spectrum.

Embodiment 2. The method of Embodiment 1, wherein A equals 50 for 10 MHz bandwidth, 75 for 15 MHz bandwidth or 100 for 20 MHz bandwidth, B equals 52 for 10 MHz bandwidth, 79 for 15 MHz bandwidth or 106 for 20 MHz bandwidth, and p equals 1 for 10 MHz bandwidth, 2 for 15 MHz bandwidth and 3 for 20 MHz bandwidth.

Embodiment 3. The method of any of Embodiments 1-2, wherein the lower part of the spectrum comprises a range from a lowest RB to a dynamically specified RB, the method further comprising obtaining the range of the lower part.

Embodiment 4. The method of any of Embodiments 1-3, further comprising:
  responsive (2203) to the slot being assigned to LTE and NR:
    responsive to a number of contiguous RBs from a lower part of the spectrum being assigned to LTE and a remaining part of the spectrum being assigned to NR, and a number of RBs assigned to LTE is not greater then floor (A/2), determining (2301) that the number of available RBs in the slot is A+p, where A is LTE bandwidth in a unit of RB and p is a number based on a bandwidth of the spectrum.
    responsive to a number of contiguous RBs from the lower part of the spectrum being assigned to LTE and the remaining part of the spectrum being assigned to NR, and a number of RBs assigned to LTE is greater than floor (A/2), determining (2303) that the number of available RBs in the slot is A+p−1.

Embodiment 5. The method of any of Embodiments 1-4, further comprising:
  responsive (2203) to the slot being assigned to LTE and NR:
    responsive to a number of contiguous RBs from a middle part of the spectrum being assigned to LTE while a lower part of the spectrum and an upper part of the spectrum are assigned to NR, and the middle part of the spectrum includes a RB that includes a subcarrier above a DC subcarrier, determining (2401) that the number of available RBs in the slot is B−1, where B is NR bandwidth in a unit of RB; and.

responsive to a number of contiguous RBs from a middle part of the spectrum being assigned to LTE while a lower part of the spectrum and an upper part of the spectrum are assigned to NR, and the middle part of the spectrum does not include a RB that includes a subcarrier above the DC subcarrier, determining (2403) that the number of available RBs in the slot is B, where B is NR bandwidth in a unit of RB.

Embodiment 6. The method of Embodiment 5, wherein a range of the middle part of the spectrum is dynamically specified, the method further comprising obtaining a starting point and an ending point of the middle part of the spectrum.

Embodiment 7. The method of any of Embodiments 1-6, further comprising:

responsive (2501) to the slot being assigned to LTE and NR and starts from a low frequency with LTE and ends at a high frequency with NR:

responsive to a number m of LTE segments crossing or being above a DC subcarrier, determining (2503) that the number of available RBs in the slot is A+p−m, where A is LTE bandwidth in a unit of RB and p is the number based on a bandwidth of the spectrum.

Embodiment 8. The method of any of Embodiments 1-7, further comprising:

responsive (2601) to the slot being assigned to LTE and NR and starts from a low frequency with NR and ends at a high frequency with LTE:

responsive (2603) to a number m of LTE segments crossing or being above a DC subcarrier, determining that the number of available RBs in the slot is A+p−(m−1), where A is LTE bandwidth in a unit of RB and p is the number based on a bandwidth of the spectrum.

Embodiment 9. The method of any of Embodiments 1-8, further comprising:

responsive (2701) to the slot being assigned to LTE and NR and starts from a low frequency with NR and ends at a high frequency with NR:

responsive (2703) to a number m of LTE segments crossing or being above a DC subcarrier, determining that the number of available RBs in the slot is B−m, where B is NR bandwidth in a unit of RB.

Embodiment 10. The method of any of Embodiments 1-9, further comprising:

responsive (2801) to the slot being assigned to LTE and NR and starts from a low frequency with LTE and ends at a high frequency with LTE:

responsive (2803) to a number m of LTE segments crossing or being above a DC subcarrier, determining that the number of available RBs in the slot is A−(m−1), where A is LTE bandwidth in a unit of RB.

Embodiment 11. The method of any of Embodiments 1-10, further comprising:

responsive (2207) to the slot being assigned only to LTE, determining (2209) that the number of available RBs in the slot is equal to A, where A is LTE bandwidth in a unit of RB.

Embodiment 12. The method of any of Embodiments 1-10, further comprising:

responsive (2211) to the slot being assigned only to NR, determining (2213) that the number of available RBs in the slot is equal to B, where B is NR bandwidth in a unit of RB Embodiment 13. The method of any of Embodiments 1-12, wherein the upper part of the spectrum comprises a range from a dynamically specified RB to a highest RB for the given bandwidth, the method further comprising obtaining the range of the upper part.

Embodiment 14. The method of any of Embodiments 1-13, further comprising:

transmitting (2215) the number of available RBs to an operations, administration, and maintenance, OAM, node.

Embodiment 15. A method performed by a processor of a network device in a network that incorporates spectrum sharing to determine a number of available resource blocks, RBs, in a time slot of a spectrum of a given bandwidth, the method comprising:

determining (2201) whether or not the slot is assigned to long term evolution, LTE, and new radio, NR; and responsive (2203) to the slot being assigned to LTE and NR:

responsive to a number of contiguous RBs from a lower part of the spectrum being assigned to LTE and a remaining part of the spectrum being assigned to NR, and a number of RBs assigned to LTE is not greater then floor (A/2), determining (2301) that the number of available RBs in the slot is A+p, where A is LTE bandwidth in a unit of RB and p is a number based on a bandwidth of the spectrum.

responsive to a number of contiguous RBs from the lower part of the spectrum being assigned to LTE and the remaining part of the spectrum being assigned to NR, and a number of RBs assigned to LTE is greater than floor (A/2), determining (2303) that the number of available RBs in the slot is A+p−1.

Embodiment 16. The method of Embodiment 15, wherein the lower part of the spectrum comprises a range from a lowest RB to a dynamically specified RB, the method further comprising obtaining the range of the lower part.

Embodiment 17. The method of any of Embodiments 15-16, further comprising:

responsive (2203) to the slot being assigned to LTE and NR:

responsive to a number of contiguous RBs from a lower part of the spectrum being assigned to NR and a remaining part of the spectrum being assigned to LTE, determining (2205) that the number of available RBs in the slot is A+p or B−p, where A is LTE bandwidth in a unit of RB, B is NR bandwidth in a unit of RB, and p is a number based on a bandwidth of the spectrum.

Embodiment 18. The method of any of Embodiments 15-17, wherein A equals 50 for 10 MHz bandwidth, 75 for 15 MHz bandwidth or 100 for 20 MHz bandwidth, B equals 52 for 10 MHz bandwidth, 79 for 15 MHz bandwidth or 106 for 20 MHz bandwidth, and p equals 1 for 10 MHz bandwidth, 2 for 15 MHz bandwidth and 3 for 20 MHz bandwidth.

17

Embodiment 19. The method of any of Embodiments 15-17, further comprising:
responsive (2203) to the slot being assigned to LTE and NR:
responsive to a number of contiguous RBs from a middle part of the spectrum being assigned to LTE while a lower part of the spectrum and an upper part of the spectrum are assigned to NR, and the middle part of the spectrum includes a RB that includes a subcarrier above a DC subcarrier, determining (2401) that the number of available RBs in the slot is B−1, where B is NR bandwidth in a unit of RB; and
responsive to a number of contiguous RBs from a middle part of the spectrum being assigned to LTE while a lower part of the spectrum and an upper part of the spectrum are assigned to NR, and the middle part of the spectrum does not include a RB that includes a subcarrier above the DC subcarrier, determining (2403) that the number of available RBs in the slot is B, where B is NR bandwidth in a unit of RB.

Embodiment 20. The method of Embodiment 19, wherein a range of the middle part of the spectrum is dynamically specified, the method further comprising obtaining a starting point and an ending point of the middle part of the spectrum.

Embodiment 21. The method of any of Embodiments 15-20, further comprising:
responsive (2501) to the slot being assigned to LTE and NR and starts from a low frequency with LTE and ends at a high frequency with NR:
responsive to a number m of LTE segments crossing or being above a DC subcarrier, determining (2503) that the number of available RBs in the slot is A+p−m, where A is LTE bandwidth in a unit of RB and p is the number based on a bandwidth of the spectrum.

Embodiment 22. The method of any of Embodiments 15-21, further comprising:
responsive (2601) to the slot being assigned to LTE and NR and starts from a low frequency with NR and ends at a high frequency with LTE:
responsive (2603) to a number m of LTE segments crossing or being above a DC subcarrier, determining that the number of available RBs in the slot is A+p−(m−1), where A is LTE bandwidth in a unit of RB and p is the number based on a bandwidth of the spectrum.

Embodiment 23. The method of any of Embodiments 15-22, further comprising:
responsive (2701) to the slot being assigned to LTE and NR and starts from a low frequency with NR and ends at a high frequency with NR:
responsive (2703) to a number m of LTE segments crossing or being above a DC subcarrier, determining that the number of available RBs in the slot is B−m, where B is NR bandwidth in a unit of RB.

Embodiment 24. The method of any of Embodiments 15-23, further comprising:
responsive (2801) to the slot being assigned to LTE and NR and starts from a low frequency with LTE and ends at a high frequency with LTE:
responsive to a number m of LTE segments crossing or being above a DC subcarrier, determining (2803) that the number of available RBs in the slot is A−(m−1), where A is LTE bandwidth in a unit of RB.

Embodiment 25. The method of any of Embodiments 15-24, further comprising:
responsive (2207) to the slot being assigned only to LTE, determining (2209) that the number of available RBs in the slot is equal to A, where A is the LTE bandwidth in a unit of RB.

Embodiment 26. The method of any of Embodiments 15-25, further comprising:
responsive (2211) to the slot being assigned only to NR, determining (2213) that the number of available RBs in the slot is equal to B, where B is NR bandwidth in a unit of RB.

Embodiment 27. The method of any of Embodiments 15-26, wherein the upper part of the spectrum comprises a range from a dynamically specified RB to a highest RB for the given bandwidth, the method further comprising obtaining the range of the upper part.

Embodiment 28. The method of any of Embodiments 15-27, further comprising:
transmitting (2215) the number of available RBs to an operations, administration, and maintenance, OAM, node.

Embodiment 29. A method performed by a processor of a network device in a network that incorporates spectrum sharing to determine a number of available resource blocks, RBs, in a time slot of a spectrum of a given bandwidth, the method comprising:
determining (2201) whether or not the slot is assigned to long term evolution, LTE, and new radio, NR;
responsive (2203) to the slot being assigned to LTE and NR:
responsive to a number of contiguous RBs from a middle part of the spectrum being assigned to LTE while a lower part of the spectrum and an upper part of the spectrum are assigned to NR, and the middle part of the spectrum includes a RB that includes a subcarrier above a DC subcarrier, determining (2401) that the number of available RBs in the slot is B−1, where B is NR bandwidth in a unit of RB. and responsive to a number of contiguous RBs from a middle part of the spectrum
being assigned to LTE while a lower part of the spectrum and a upper part of the spectrum are assigned to NR, and the middle part of the spectrum does not include a RB that includes a subcarrier above the DC subcarrier, determining (2403) that the number of available RBs in the slot is B, where B is NR bandwidth in a unit of RB.

Embodiment 30. The method of Embodiment 29, wherein the lower part of the spectrum comprises a range from a lowest RB to a dynamically specified RB, the method further comprising obtaining the range of the lower part.

Embodiment 31. The method of any of Embodiments 29-30, further comprising:
responsive (2203) to the slot being assigned to LTE and NR:
responsive to a number of contiguous RBs from a lower part of the spectrum being assigned to NR and a remaining part of the spectrum being assigned to LTE, determining (2205) that the number of available RBs in the slot is A+p or B−p, where A is LTE bandwidth in a unit of RB, B is NR bandwidth in a unit of RB, and p is a number based on a bandwidth of the spectrum.

Embodiment 32. The method of any of Embodiments 29-31, wherein A equals 50 for 10 MHz bandwidth, 75 for 15 MHz bandwidth or 100 for 20 MHz bandwidth, B equals 52 for 10 MHz bandwidth, 79 for 15 MHz bandwidth or 106 for 20 MHz bandwidth, and p equals 1 for 10 MHz bandwidth, 2 for 15 MHz bandwidth and 3 for 20 MHz bandwidth Embodiment 33. The method of any of Embodiments 29-32, further comprising:
responsive (2203) to the slot being assigned to LTE and NR:
responsive to a number of contiguous RBs from a lower part of the spectrum being assigned to LTE and a remaining part of the spectrum being assigned to NR, and a number of RBs assigned to LTE is not greater then floor (A/2), determining (2301) that the number of available RBs in the slot is A+p, where A is LTE bandwidth in a unit of RB and p is a number based on a bandwidth of the spectrum.
responsive to a number of contiguous RBs from the lower part of the spectrum being assigned to LTE and the remaining part of the spectrum being assigned to NR, and a number of RBs assigned to LTE is greater than floor (A/2), determining (2303) that the number of available RBs in the slot is A+p-1.

Embodiment 34. The method of any of Embodiments 29-33, wherein a range of the middle part of the spectrum is dynamically specified, the method further comprising obtaining a starting point and an ending point of the middle part of the spectrum.

Embodiment 35. The method of any of Embodiments 29-34, further comprising:
responsive (2501) to the slot being assigned to LTE and NR and starts from a low frequency with LTE and ends at a high frequency with NR:
responsive to a number m of LTE segments crossing or being above a DC subcarrier, determining (2503) that the number of available RBs in the slot is A+p-m, where A is LTE bandwidth in a unit of RB and p is the number based on a bandwidth of the spectrum Embodiment 36. The method of any of Embodiments 29-35, further comprising:
responsive (2601) to the slot being assigned to LTE and NR and starts from a low frequency with NR and ends at a high frequency with LTE:
responsive (2603) to a number m of LTE segments crossing or being above a DC subcarrier, determining that the number of available RBs in the slot is A+p-(m-1), where A is LTE bandwidth in a unit of RB and p is the number based on a bandwidth of the spectrum.

Embodiment 37. The method of any of Embodiments 29-36 further comprising:
responsive (2701) to the slot being assigned to LTE and NR and starts from a low frequency with NR and ends at a high frequency with NR:
responsive (2703) to a number m of LTE segments crossing or being above a DC subcarrier, determining that the number of available RBs in the slot is B-m, where B is NR bandwidth in a unit of RB.

Embodiment 38. The method of any of Embodiments 29-37, further comprising:
responsive (2801) to the slot being assigned to LTE and NR and starts from a low frequency with LTE and ends at a high frequency with LTE:
responsive to a number m of LTE segments crossing or being above a DC subcarrier, determining (2803) that the number of available RBs in the slot is A-(m-1), where A is LTE bandwidth in a unit of RB.

Embodiment 39. The method of any of Embodiments 29-38, further comprising:
responsive (2207) to the slot being assigned only to LTE, determining (2209) that the number of available RBs in the slot is equal to A, where A is LTE bandwidth in a unit of RB.

Embodiment 40. The method of any of Embodiments 29-39, further comprising:
responsive (2211) to the slot being assigned only to NR, determining (2213) that the number of available RBs in the slot is equal to B, where B the is NR bandwidth in a unit of RB.

Embodiment 41. The method of any of Embodiments 29-40, wherein the upper part of the spectrum comprises a range from a dynamically specified RB to a highest RB for the given bandwidth, the method further comprising obtaining the range of the upper part.

Embodiment 42. The method of any of Embodiments 29-41, further comprising:
transmitting (2215) the number of available RBs to an operations, administration, and maintenance, OAM, node.

Embodiment 43. A method performed by a processor of a network device in a network that incorporates spectrum sharing to determine a number of available resource blocks, RBs, in a time slot of a spectrum of a given bandwidth, the method comprising:
determining (2201) whether or not the slot is assigned to long term evolution, LTE, and new radio, NR; and
responsive (2501) to the slot being assigned to LTE and NR and starts from a low frequency with LTE and ends at a high frequency with NR:
responsive to a number m of LTE segments crossing or being above a DC subcarrier, determining (2503) that the number of available RBs in the slot is A+p-m, where A is LTE bandwidth in a unit of RB and p is a number based on a bandwidth of the spectrum.

Embodiment 44. The method of Embodiments 43, further comprising:
responsive (2203) to the slot being assigned to LTE and NR:
responsive to a number of contiguous RBs from a lower part of the spectrum being assigned to NR and a remaining part of the spectrum being assigned to LTE, determining (2205) that the number of available RBs in the slot is A+p or B-p, where A is the LTE bandwidth in a unit of RB, B is NR bandwidth in a unit of RB, and p is the number based on a bandwidth of the spectrum.

Embodiment 45. The method of Embodiment 44, wherein the lower part of the spectrum comprises a range from a lowest RB to a dynamically specified RB, the method further comprising obtaining the range of the lower part.

Embodiment 46. The method of any of Embodiments 43-45, wherein A equals 50 for 10 MHz bandwidth, 75 for 15 MHz bandwidth or 100 for 20 MHz bandwidth, B equals 52 for 10 MH bandwidth z, 79 for 15 MHz bandwidth or 106 for 20 MHz bandwidth, and p equals 1 for 10 MHz bandwidth, 2 for 15 MHz bandwidth and 3 for 20 MHz bandwidth.

Embodiment 47. The method of any of Embodiments 43-46, further comprising:
responsive (2203) to the slot being assigned to LTE and NR:
responsive to a number of contiguous RBs from a lower part of the spectrum being assigned to LTE and a remaining part of the spectrum being assigned to NR, and a number of RBs assigned to LTE is not greater then floor (A/2), determining (2301) that the number of available RBs in the slot is A+p, where A is LTE bandwidth in a unit of RB and p is a number based on a bandwidth of the spectrum.
responsive to a number of contiguous RBs from the lower part of the spectrum being assigned to LTE and the remaining part of the spectrum being assigned to NR, and a number of RBs assigned to LTE is greater than floor (A/2), determining (2303) that the number of available RBs in the slot is A+p−1.

Embodiment 48. The method of any of Embodiments 43-47, further comprising:
responsive (2203) to the slot being assigned to LTE and NR:
responsive to a number of contiguous RBs from a middle part of the spectrum being assigned to LTE while a lower part of the spectrum and an upper part of the spectrum are assigned to NR, and the middle part of the spectrum includes a RB that includes a subcarrier above a DC subcarrier, determining (2401) that the number of available RBs in the slot is B−1, where B is NR bandwidth in a unit of RB; and.
responsive to a number of contiguous RBs from a middle part of the spectrum being assigned to LTE while a lower part of the spectrum and a upper part of the spectrum are assigned to NR, and the middle part of the spectrum does not include a RB that includes a subcarrier above the DC subcarrier, determining (2403) that the number of available RBs in the slot is B, where B is NR bandwidth in a unit of RB.

Embodiment 49. The method of any of Embodiments 48, wherein a range of the middle part of the spectrum is dynamically specified, the method further comprising obtaining a starting point and an ending point of the middle part of the spectrum.

Embodiment 50. The method of any of Embodiments 43-49, further comprising:
responsive (2701) to the slot being assigned to LTE and NR and starts from a low frequency with NR and ends at a high frequency with NR:
responsive (2703) to a number m of LTE segments crossing or being above a DC subcarrier, determining that the number of available RBs in the slot is B−m, where B is NR bandwidth in a unit of RB.

Embodiment 51. The method of any of Embodiments 43-50, further comprising:
responsive (2601) to the slot being assigned to LTE and NR and starts from a low frequency with NR and ends at a high frequency with LTE:
responsive (2603) to a number m of LTE segments crossing or being above a DC subcarrier, determining that the number of available RBs in the slot is A+p−(m−1), where A is LTE bandwidth in a unit of RB and p is the number based on a bandwidth of the spectrum.

Embodiment 52. The method of any of Embodiments 43-51, further comprising:
responsive (2801) to the slot being assigned to LTE and NR and starts from a low frequency with LTE and ends at a high frequency with LTE:
responsive to a number m of LTE segments crossing or being above a DC subcarrier, determining (2803) that the number of available RBs in the slot is A−(m−1), where A is LTE bandwidth in a unit of RB.

Embodiment 53. The method of any of Embodiments 43-52, further comprising:
responsive (2207) to the slot being assigned only to LTE, determining (2209) that the number of available RBs in the slot is equal to A, where A is the LTE bandwidth in a unit of RB.

Embodiment 54. The method of any of Embodiments 43-53, further comprising:
responsive (2211) to the slot being assigned only to NR, determining (2213) that the number of available RBs in the slot is equal to B, where B is NR bandwidth in a unit of RB.

Embodiment 55. The method of any of Embodiments 43-54, wherein the upper part of the spectrum comprises a range from a dynamically specified RB to a highest RB for the given bandwidth, the method further comprising obtaining the range of the upper part.

Embodiment 56. The method of any of Embodiments 43-55, further comprising:
transmitting (2215) the number of available RBs to an operations, administration, and maintenance, OAM, node.

Embodiment 57. A method performed by a processor of a network device in a network that incorporates spectrum sharing to determine a number of available resource blocks, RBs, in a time slot of a spectrum of a given bandwidth, the method comprising:
determining (2201) whether or not the slot is assigned to long term evolution, LTE, and new radio, NR; and
responsive (2601) to the slot being assigned to LTE and NR and starts from a low frequency with NR and ends at a high frequency with LTE:
responsive (2603) to a number m of LTE segments crossing or being above a DC subcarrier, determining that the number of available RBs in the slot is A+p−(m−1), where A is LTE bandwidth in a unit of RB and p is the number based on a bandwidth of the spectrum.

Embodiment 58. The method of Embodiment 57, wherein A equals 50 for 10 MHz bandwidth, 75 for 15 MHz bandwidth or 100 for 20 MHz bandwidth, B equals 52 for 10 MH bandwidth z, 79 for 15 MHz bandwidth or 106 for 20 MHz bandwidth, and p equals 1 for 10 MHz bandwidth, 2 for 15 MHz bandwidth and 3 for 20 MHz bandwidth.

Embodiment 59. The method of any of Embodiments 57-58, further comprising:
responsive (2203) to the slot being assigned to LTE and NR:
responsive to a number of contiguous RBs from a lower part of the spectrum being assigned to NR and a remaining part of the spectrum being assigned to LTE, determining (2205) that the number of available RBs in the slot is A+p or B−p, where A is LTE bandwidth in a unit of RB, B is NR bandwidth in a unit of RB, and p is a number based on a bandwidth of the spectrum.

Embodiment 60. The method of Embodiment 59, wherein the lower part of the spectrum comprises a range from a lowest RB to a dynamically specified RB, the method further comprising obtaining the range of the lower part.

Embodiment 61. The method of any of Embodiments 57-60, further comprising:
responsive (2203) to the slot being assigned to LTE and NR:
responsive to a number of contiguous RBs from a lower part of the spectrum being assigned to LTE and a remaining part of the spectrum being assigned to NR, and a number of RBs assigned to LTE is not greater then floor (A/2), determining (2301) that the number of available RBs in the slot is A+p, where A is LTE bandwidth in a unit of RB and p is a number based on a bandwidth of the spectrum.
responsive to a number of contiguous RBs from the lower part of the spectrum being assigned to LTE and the remaining part of the spectrum being assigned to NR, and a number of RBs assigned to LTE is greater than floor (A/2), determining (2303) that the number of available RBs in the slot is A+p−1.

Embodiment 62. The method of any of Embodiments 57-61, further comprising:
responsive (2203) to the slot being assigned to LTE and NR:
responsive to a number of contiguous RBs from a middle part of the spectrum being assigned to LTE while a lower part of the spectrum and an upper part of the spectrum are assigned to NR, and the middle part of the spectrum includes a RB that includes a subcarrier above a DC subcarrier, determining (2401) that the number of available RBs in the slot is B−1, where B is NR bandwidth in a unit of RB; and responsive to a number of contiguous RBs from a middle part of the spectrum being assigned to LTE while a lower part of the spectrum and a upper part of the spectrum are assigned to NR, and the middle part of the spectrum does not include a RB that includes a subcarrier above the DC subcarrier, determining (2403) that the number of available RBs in the slot is B, where B is NR bandwidth in a unit of RB.

Embodiment 63. The method of Embodiment 62, wherein a range of the middle part of the spectrum is dynamically specified, the method further comprising obtaining a starting point and an ending point of the middle part of the spectrum.

Embodiment 64. The method of any of Embodiments 57-63, further comprising:
responsive (2701) to the slot being assigned to LTE and NR and starts from a low frequency with NR and ends at a high frequency with NR:
responsive (2703) to a number m of LTE segments crossing or being above a DC subcarrier, determining that the number of available RBs in the slot is B−m, where B is NR bandwidth in a unit of RB.

Embodiment 65. The method of any of Embodiments 57-64, further comprising:
responsive (2501) to the slot being assigned to LTE and NR and starts from a low frequency with LTE and ends at a high frequency with NR:
responsive to a number m of LTE segments crossing or being above a DC subcarrier, determining (2503) that the number of available RBs in the slot is A+p−m, where A is LTE bandwidth in a unit of RB and p is the number based on a bandwidth of the spectrum.

Embodiment 66. The method of any of Embodiments 57-65, further comprising:
responsive (2801) to the slot being assigned to LTE and NR and starts from a low frequency with LTE and ends at a high frequency with LTE:
responsive to a number m of LTE segments crossing or being above a DC subcarrier, determining (2803) that the number of available RBs in the slot is A−(m−1), where A is LTE bandwidth in a unit of RB.

Embodiment 67. The method of any of Embodiments 57-66, further comprising:
responsive (2207) to the slot being assigned only to LTE, determining (2209) that the number of available RBs in the slot is equal to A, where A is the LTE bandwidth in a unit of RB.

Embodiment 68. The method of any of Embodiments 57-68, further comprising:
responsive (2211) to the slot being assigned only to NR, determining (2213) that the number of available RBs in the slot is equal to B, where B is NR bandwidth in a unit of RB.

Embodiment 69. The method of any of Embodiments 57-68, wherein the upper part of the spectrum comprises a range from a dynamically specified RB to a highest RB for the given bandwidth, the method further comprising obtaining the range of the upper part.

Embodiment 70. The method of any of Embodiments 57-69, further comprising:
transmitting (2215) the number of available RBs to an operations, administration, and maintenance, OAM, node.

Embodiment 71. A method performed by a processor of a network device in a network that incorporates spectrum sharing to determine a number of available resource blocks, RBs, in a time slot of a spectrum of a given bandwidth, the method comprising:
determining (2201) whether or not the slot is assigned to long term evolution, LTE, and new radio, NR; and
responsive (2701) to the slot being assigned to LTE and NR and starts from a low frequency with NR and ends at a high frequency with NR:
responsive (2703) to a number m of LTE segments crossing or being above a DC subcarrier, determining that the number of available RBs in the slot is B−m, where B is NR bandwidth in a unit of RB.

Embodiment 72. The method of Embodiment 71, further comprising:
responsive (2203) to the slot being assigned to LTE and NR:
responsive to a number of contiguous RBs from a lower part of the spectrum being assigned to NR and a remaining part of the spectrum being assigned to LTE, determining (2205) that the number of available RBs in the slot is A+p or B−p, where A is LTE bandwidth in a unit of RB, B is NR bandwidth in a unit of RB, and p is a number based on a bandwidth of the spectrum.

Embodiment 73. The method of Embodiment 72, wherein the lower part of the spectrum comprises a range from a lowest RB to a dynamically specified RB, the method further comprising obtaining the range of the lower part.

Embodiment 74. The method of any of Embodiments 71-73, wherein A equals 50 for 10 MHz bandwidth, 75 for 15 MHz bandwidth or 100 for 20 MHz bandwidth, B equals 52 for 10 MHz bandwidth, 79 for 15 MHz bandwidth or 106 for 20 MHz bandwidth, and p equals 1 for 10 MHz bandwidth, 2 for 15 MHz bandwidth and 3 for 20 MHz bandwidth.

Embodiment 75. The method of any of Embodiments 71-74, further comprising:
responsive (2203) to the slot being assigned to LTE and NR:
responsive to a number of contiguous RBs from a lower part of the spectrum being assigned to LTE and a remaining part of the spectrum being assigned to NR, and a number of RBs assigned to LTE is not greater then floor (A/2), determining (2301) that the number of available RBs in the slot is A+p, where A is LTE bandwidth in a unit of RB and p is a number based on a bandwidth of the spectrum.
responsive to a number of contiguous RBs from the lower part of the spectrum being assigned to LTE and the remaining part of the spectrum being assigned to NR, and a number of RBs assigned to LTE is greater than floor (A/2), determining (2303) that the number of available RBs in the slot is A+p−1.

Embodiment 76. The method of any of Embodiments 71-75, further comprising:
responsive (2203) to the slot being assigned to LTE and NR:
responsive to a number of contiguous RBs from a middle part of the spectrum being assigned to LTE while a lower part of the spectrum and an upper part of the spectrum are assigned to NR, and the middle part of the spectrum includes a RB that includes a subcarrier above a DC subcarrier, determining (2401) that the number of available RBs in the slot is B−1, where B is NR bandwidth in a unit of RB; and
responsive to a number of contiguous RBs from a middle part of the spectrum being assigned to LTE while a lower part of the spectrum and a upper part of the spectrum are assigned to NR, and the middle part of the spectrum does not include a RB that includes a subcarrier above the DC subcarrier, determining (2403) that the number of available RBs in the slot is B, where B is NR bandwidth in a unit of RB.

Embodiment 77. The method of Embodiment 76, wherein a range of the middle part of the spectrum is dynamically specified, the method further comprising obtaining a starting point and an ending point of the middle part of the spectrum.

Embodiment 78. The method of any of Embodiments 71-77, further comprising:
responsive (2501) to the slot being assigned to LTE and NR and starts from a low frequency with LTE and ends at a high frequency with NR:
responsive to a number m of LTE segments crossing or being above a DC subcarrier, determining (2503) that the number of available RBs in the slot is A+p−m, where A is LTE bandwidth in a unit of RB and p is the number based on a bandwidth of the spectrum.

Embodiment 79. The method of any of Embodiments 71-78, further comprising:
responsive (2601) to the slot being assigned to LTE and NR and starts from a low frequency with NR and ends at a high frequency with LTE:
responsive to a number m of LTE segments crossing or being above a DC subcarrier, determining (2603) that the number of available RBs in the slot is A+p−(m−1), where A is LTE bandwidth in a unit of RB and p is a number based on a bandwidth of the spectrum.

Embodiment 80. The method of any of Embodiments 71-79, further comprising:
responsive (2801) to the slot being assigned to LTE and NR and starts from a low frequency with LTE and ends at a high frequency with LTE:
responsive to a number m of LTE segments crossing or being above a DC subcarrier, determining (2803) that the number of available RBs in the slot is A−(m−1), where A is LTE bandwidth in a unit of RB.

Embodiment 81. The method of any of Embodiments 71-80, further comprising:
responsive (2207) to the slot being assigned only to LTE, determining (2209) that the number of available RBs in the slot is equal to A, where A is LTE bandwidth in a unit of RB.

Embodiment 82. The method of any of Embodiments 71-81, further comprising:
responsive (2211) to the slot being assigned only to NR, determining (2213) that the number of available RBs in the slot is equal to B, where B is the NR bandwidth in a unit of RB.

Embodiment 83. The method of any of Embodiments 71-82, wherein the upper part of the spectrum comprises a range from a dynamically specified RB to a highest RB for the given bandwidth, the method further comprising obtaining the range of the upper part.

Embodiment 84. The method of any of Embodiments 71-83, further comprising:
transmitting (2215) the number of available RBs to an operations, administration, and maintenance, OAM, node.

Embodiment 85. A method performed by a processor of a network device in a network that incorporates spectrum sharing to determine a number of available resource blocks, RBs, in a time slot of a spectrum of a given bandwidth, the method comprising:
determining (2201) whether or not the slot is assigned to long term evolution, LTE, and new radio, NR; and
responsive (2801) to the slot being assigned to LTE and NR and starts from a low frequency with LTE and ends at a high frequency with LTE:
responsive to a number m of LTE segments crossing or being above a DC subcarrier, determining (2803) that the number of available RBs in the slot is A−(m−1), where A is LTE bandwidth in a unit of RB.

Embodiment 86. The method of Embodiment 85, wherein A equals 50 for 10 MHz bandwidth, 75 for 15 MHz bandwidth or 100 for 20 MHz bandwidth, B equals 52 for 10 MHz bandwidth, 79 for 15 MHz bandwidth or 106 for 20 MHz bandwidth, and p equals 1 for 10 MHz bandwidth, 2 for 15 MHz bandwidth and 3 for 20 MHz bandwidth.

Embodiment 87. The method of any of Embodiments 85-86, further comprising:
responsive (2203) to the slot being assigned to LTE and NR:
responsive to a number of contiguous RBs from a lower part of the spectrum being assigned to NR and a remaining part of the spectrum being assigned to LTE, determining (2205) that the number of available RBs in the slot is A+p or B−p, where A is the LTE bandwidth in a unit of RB, B is NR bandwidth in a unit of RB, and p is a number based on a bandwidth of the spectrum.

Embodiment 88. The method of Embodiment 87, wherein the lower part of the spectrum comprises a range from a lowest RB to a dynamically specified RB, the method further comprising obtaining the range of the lower part.

Embodiment 89. The method of any of Embodiments 85-88, further comprising:
responsive (2203) to the slot being assigned to LTE and NR:
responsive to a number of contiguous RBs from a lower part of the spectrum being assigned to LTE and a remaining part of the spectrum being assigned to NR, and a number of RBs assigned to LTE is not greater then floor (A/2), determining (2301) that the number of available RBs in the slot is A+p, where A is the LTE bandwidth in a unit of RB and p is a number based on a bandwidth of the spectrum.
responsive to the number of contiguous RBs from the lower part of the spectrum being assigned to LTE and the remaining part of the spectrum being assigned to NR, and the number of RBs assigned to LTE is greater than floor (A/2), determining (2303) that the number of available RBs in the slot is A+p−1.

Embodiment 90. The method of any of Embodiments 85-89 further comprising:
responsive (2203) to the slot being assigned to LTE and NR:
responsive to a number of contiguous RBs from a middle part of the spectrum being assigned to LTE while a lower part of the spectrum and a upper part of the spectrum are assigned to NR, and the middle part of the spectrum includes a RB that includes a subcarrier above a DC subcarrier, determining (2401) that the number of available RBs in the slot is B−1, where B is NR bandwidth in a unit of RB; and
responsive to a number of contiguous RBs from a middle part of the spectrum being assigned to LTE while a lower part of the spectrum and an upper part of the spectrum are assigned to NR, and the middle part of the spectrum does not include a RB that includes a subcarrier above the DC subcarrier, determining (2403) that the number of available RBs in the slot is B, where B is NR bandwidth in a unit of RB.

Embodiment 91. The method of Embodiments 90, wherein a range of the middle part of the spectrum is dynamically specified, the method further comprising obtaining a starting point and an ending point of the middle part of the spectrum.

Embodiment 92. The method of any of Embodiments 85-91, further comprising:
responsive (2501) to the slot being assigned to LTE and NR and starts from a low frequency with LTE and ends at a high frequency with NR:
responsive to a number m of LTE segments crossing or being above a DC subcarrier, determining (2503) that the number of available RBs in the slot is A+p−m, where A is the LTE bandwidth in a unit of RB and p is a number based on a bandwidth of the spectrum.

Embodiment 93. The method of any of Embodiments 85-92, further comprising:
responsive (2601) to the slot being assigned to LTE and NR and starts from a low frequency with NR and ends at a high frequency with LTE:
responsive to a number m of LTE segments crossing or being above a DC subcarrier, determining (2603) that the number of available RBs in the slot is A+p−(m−1), where A is the LTE bandwidth in a unit of RB and p is a number based on a bandwidth of the spectrum.

Embodiment 94. The method of any of Embodiments 85-93, further comprising:
responsive (2701) to the slot being assigned to LTE and NR and starts from a low frequency with NR and ends at a high frequency with NR:
responsive (2703) to a number m of LTE segments crossing or being above a DC subcarrier, determining that the number of available RBs in the slot is B−m, where B is NR bandwidth in a unit of RB.

Embodiment 95. The method of any of Embodiments 85-94, further comprising:
responsive (2207) to the slot being assigned only to LTE (2207), determining (2209) that the number of available RBs in the slot is equal to A, where A is the LTE bandwidth in a unit of RB.

Embodiment 96. The method of any of Embodiments 85-95, further comprising:
responsive to the slot being assigned only to NR (2211), determining (2213) that the number of available RBs in the slot is equal to B, where B is NR bandwidth in a unit of RB.

Embodiment 97. The method of any of Embodiments 85-96, wherein the upper part of the spectrum comprises a range from a dynamically specified RB to a highest RB for the given bandwidth, the method further comprising obtaining the range of the upper part.

Embodiment 98. The method of any of Embodiments 85-97, further comprising:
transmitting (2215) the number of available RBs to an operations, administration, and maintenance, OAM, node.

Embodiment 99. A radio access network, RAN, node adapted to perform according to any of Embodiments 1-98.

Embodiment 100. A radio access network, RAN, node (2000) comprising:
processing circuitry (2003); and
memory (2005) coupled with the processing circuitry, wherein the memory includes instructions that when executed by the processing circuitry causes the RAN node to perform operations according to any of Embodiments 1-98.

Embodiment 101. A computer program comprising program code to be executed by processing circuitry (2003) of a radio access network, RAN, node (2000), whereby execution of the program code causes the RAN node (2000) to perform operations according to any of Embodiments 1-98.

Embodiment 102. A computer program product comprising a non-transitory storage medium including program code to be executed by processing circuitry (2003) of a radio access network, RAN, node (2000), whereby execution of the program code causes the RAN node (2000) to perform operations according to any of embodiments 1-98.

Explanations are provided below for various abbreviations/acronyms used in the present disclosure.

| Abbreviation | Explanation |
|---|---|
| eNB | E-UTRAN NodeB |
| gNB | Base station in NR |
| RB | Resource Block |
| LTE | Long Term Evolution |
| NR | New Radio |

References are identified below.
[1] 3GPP TS38.211 V16.2.0; Technical Specification Group Radio Access Network; NR; Physical Channels and Modulation; Release 16
[2] 3GPP TS36.101 V16.6.; Technical Specification Group Radio Access Network; Evolved Universal Terrestrial Radio Access (E-UTRA); User Equipment (UE) radio transmission and reception (Release 16)
[3] 3GPP TS38.101-1 V16.4.0; Technical Specification Group Radio Access Network; NR; User Equipment (UE) radio transmission and reception; Part 1: Range 1 Standalone (Release 16)
[4] 3GPP TS38.101-1 V16.4.0; Technical Specification Group Radio Access Network; NR; User Equipment (UE) radio transmission and reception; Part 2: Range 2 Standalone (Release 16)

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a processor of a network device in a network that incorporates spectrum sharing to determine a number of available resource blocks, RBs, in a time slot of a spectrum of a given bandwidth, the method comprising:
   determining whether or not the slot is assigned to long term evolution, LTE, and new radio, NR; and
   responsive to the slot being assigned to LTE and NR and starts from a low frequency with NR and ends at a high frequency with LTE with a number of RB segments being assigned to LTE and NR, and the RB segment at a lowest part of the spectrum being assigned to NR and the RB segment at a highest part of the spectrum being assigned to LTE:
      responsive to a number m of LTE segments crossing or being above a DC subcarrier, determining that the number of available RBs in the slot is A+p−(m−1), or B−p−(m−1), where A is LTE cell channel bandwidth in a unit of RB and B is NR cell channel bandwidth in a unit of RB and p is the number based on a cell channel bandwidth of the spectrum.

2. The method of claim 1, wherein A equals 50 for 10 MHz bandwidth, 75 for 15 MHz bandwidth or 100 for 20 MHz bandwidth, B equals 52 for 10 MH bandwidth z, 79 for 15 MHz bandwidth or 106 for 20 MHz bandwidth, and p equals 1 for 10 MHz bandwidth, 2 for 15 MHz bandwidth and 3 for 20 MHz bandwidth.

3. The method of claim 1, wherein an RB segment consists of a number of contiguous RBs assigned either to LTE or NR.

4. The method of claim 1, wherein the RB segment at the lowest part of the spectrum is the RB segment that includes the lowest RB among all RB segments assigned to both LTE and NR.

5. The method of claim 1, wherein the RB segment at the highest part of the spectrum is the RB segment that includes the highest RB among all RB segments assigned to both LTE and NR.

6. The method of claim 1, further comprising:
   responsive to the slot being assigned only to LTE, determining that the number of available RBs in the slot is equal to A, where A is the LTE cell channel bandwidth in a unit of RB.

7. The method of claim 1, further comprising:
   responsive to the slot being assigned only to NR, determining that the number of available RBs in the slot is equal to B, where B is NR cell channel bandwidth in a unit of RB.

8. The method of claim 1, further comprising:
   transmitting the number of available RBs to an operations, administration, and maintenance, OAM, node.

9. A method performed by a processor of a network device in a network that incorporates spectrum sharing to determine a number of available resource blocks, RBs, in a time slot of a spectrum of a given bandwidth, the method comprising:
  determining whether or not the slot is assigned to long term evolution, LTE, and new radio, NR; and
  responsive to the slot being assigned to LTE and NR and starts from a low frequency with NR and ends at a high frequency with NR with a number of RB segments being assigned to LTE and NR, and the RB segment at the lowest part of the spectrum being assigned to NR, and the RB segment at the highest part of the spectrum being assigned to NR:
    responsive to a number m of LTE segments crossing or being above a DC subcarrier, determining that the number of available RBs in the slot is B-m, where B is NR cell channel bandwidth in a unit of RB.

10. The method of claim 9, wherein A equals 50 for 10 MHz bandwidth, 75 for 15 MHz bandwidth or 100 for 20 MHz bandwidth, B equals 52 for 10 MH bandwidth z, 79 for 15 MHz bandwidth or 106 for 20 MHz bandwidth, and p equals 1 for 10 MHz bandwidth, 2 for 15 MHz bandwidth and 3 for 20 MHz bandwidth.

11. The method of claim 9, wherein an RB segment consists of a number of contiguous RBs assigned either to LTE or NR.

12. The method of claim 9, wherein the RB segment at the lowest part of the spectrum is the RB segment that includes the lowest RB among all RB segments assigned to both LTE and NR.

13. The method of claim 9, wherein the RB segment at the highest part of the spectrum is the RB segment that includes the highest RB among all RB segments assigned to both LTE and NR.

14. The method of claim 9, further comprising:
  responsive to the slot being assigned only to LTE, determining that the number of available RBs in the slot is equal to A, where A is LTE cell channel bandwidth in a unit of RB.

15. The method of claim 9, further comprising:
  responsive to the slot being assigned only to NR, determining that the number of available RBs in the slot is equal to B, where B is the NR cell channel bandwidth in a unit of RB.

16. The method of claim 9, further comprising:
  transmitting the number of available RBs to an operations, administration, and maintenance, OAM, node.

17. A method performed by a processor of a network device in a network that incorporates spectrum sharing to determine a number of available resource blocks, RBs, in a time slot of a spectrum of a given bandwidth, the method comprising:
  determining whether or not the slot is assigned to long term evolution, LTE, and new radio, NR; and
  responsive to the slot being assigned to LTE and NR and starts from a low frequency with LTE with an RB segment at a lowest part of the spectrum being assigned to LTE and
  determining whether the RB segment at a highest part of the spectrum is assigned to LTE or NR:
    responsive to the RB segment at the highest part of the spectrum being assigned to NR and a number m of LTE RB segments crossing or being above a DC subcarrier, determining that the number of available RBs in the slot is A+p-m, or B-p-m, where A is LTE cell channel bandwidth in a unit of RB and B is NR cell channel bandwidth in a unit of RB and p is a number based on a cell channel bandwidth of the spectrum.

18. The method of claim 17, wherein A equals 50 for 10 MHz bandwidth, 75 for 15 MHz bandwidth or 100 for 20 MHz bandwidth, B equals 52 for 10 MH bandwidth z, 79 for 15 MHz bandwidth or 106 for 20 MHz bandwidth, and p equals 1 for 10 MHz bandwidth, 2 for 15 MHz bandwidth and 3 for 20 MHz bandwidth.

19. The method of claim 17, wherein an RB segment consists of a number of contiguous RBs assigned either to LTE or NR.

20. The method of claim 17, wherein the RB segment at the lowest part of the spectrum is the RB segment that includes the lowest RB among all RB segments assigned to both LTE and NR.

21. The method of claim 17, wherein the RB segment at the highest part of the spectrum is the RB segment that includes the highest RB among all RB segments assigned to both LTE and NR.

22. The method of claim 17, further comprising:
  responsive to the slot being assigned to LTE and NR:
    responsive to the RB segment at the lowest part of the spectrum being assigned to LTE and the RB segment at the highest part of the spectrum being assigned to LTE and a number m of LTE RB segments crossing or being above a DC subcarrier
    determining that the number of available RBs in the slot is A-(m-1), where A is LTE cell channel bandwidth in a unit of RB.

23. The method of claim 17, further comprising:
  responsive to the slot being assigned only to LTE, determining that the number of available RBs in the slot is equal to A, where A is the LTE cell channel bandwidth in a unit of RB.

24. The method of claim 17, further comprising:
  responsive to the slot being assigned only to NR, determining that the number of available RBs in the slot is equal to B, where B is NR cell channel bandwidth in a unit of RB.

* * * * *